United States Patent
Cornfield

(10) Patent No.: US 7,059,318 B2
(45) Date of Patent: Jun. 13, 2006

(54) MULTI-PURPOSE STOVETOP GRILLING AND COOKING DEVICE

(76) Inventor: Randall Cornfield, 5499 Robert Burns #306, Montreal, Quebec (CA) 4W-2B4

( * ) Notice: Subject to any disclaimer, the term of this patent is extended or adjusted under 35 U.S.C. 154(b) by 0 days.

(21) Appl. No.: 10/422,527

(22) Filed: Apr. 24, 2003

(65) Prior Publication Data

US 2004/0211406 A1 Oct. 28, 2004

(51) Int. Cl.
A47J 37/00 (2006.01)
F24C 15/00 (2006.01)

(52) U.S. Cl. .............................. 126/41 R; 126/275 R; 99/446; 99/450

(58) Field of Classification Search .............. 126/41 R, 126/273.5, 275 R; 99/400, 422, 425, 426, 99/444–446, 449, 450
See application file for complete search history.

(56) References Cited

U.S. PATENT DOCUMENTS

| | | | |
|---|---|---|---|
| 181,823 A | 9/1876 | Cornwall | |
| 566,226 A | 8/1896 | Reutlinger | |
| 1,630,787 A | 5/1927 | Cullen | |
| 1,732,554 A | 10/1929 | Detwiler | |
| 2,012,520 A | 8/1935 | Rogers | |
| 2,198,647 A | 4/1940 | Wolcott | |
| 2,528,233 A | 10/1950 | Kubricht | |
| 2,675,458 A | 4/1954 | Stiles | |
| 2,908,214 A | 10/1959 | Persinger | |
| D197,663 S | 3/1964 | O'Reilly | |
| 3,186,331 A | 6/1965 | Dettling | |
| 3,308,747 A | 3/1967 | Spagnolo | |
| 3,427,957 A | 2/1969 | O'Reilly | |
| 3,454,377 A | 7/1969 | Renwick, Jr. | |
| 3,651,596 A | 3/1972 | Orsing | |
| D227,028 S | 5/1973 | Behm | |
| 3,812,840 A | 5/1974 | Whaler | |
| 3,847,068 A | 11/1974 | Beer et al. | |
| 3,963,898 A | 6/1976 | Tuckwell | |
| 4,011,431 A | 3/1977 | Levin | |
| 4,095,957 A | 6/1978 | Orsing | |

(Continued)

FOREIGN PATENT DOCUMENTS

WO    WO 01/17409 A1    3/2001

Primary Examiner—Josiah C. Cocks

(57) ABSTRACT

A cooking device for cooking items over a heat source has a base with an annular reservoir having an inside rim defining an opening, a substantially circular cooking plate supported by the base, a rack supported by the base over the cooking plate, and a lid supported by the base over the cooking plate and the rack. The base of the cooking device has an annular cooking plate supporting surface located radially outwardly from an outside rim of the annular reservoir, an annular rack supporting surface located radially outwardly from the cooking plate supporting surface, an annular lid supporting surface located radially outwardly from the rack supporting surface, an outer rim projecting radially outwardly and upwardly from the lid supporting surface, an upwardly-projecting annular sealing portion located intermediate the rack supporting portion and the lid supporting portion, an annular cooking plate retaining surface disposed radially outwardly from the cooking plate supporting surface, and discrete support elements projecting downwardly from the base. A reversible cooking plate has a grilling surface on one side and a griddle surface on an opposite side. In one position, the grilling surface is directed upwardly and is inclined at an angle, in a second position, the griddle surface is directed upwardly and is substantially horizontal. A rim of varying height extends around the periphery of the griddle surface and aligns the griddle surface at an angle when in the first position.

48 Claims, 16 Drawing Sheets

U.S. PATENT DOCUMENTS

| | | |
|---|---|---|
| D251,176 S | 2/1979 | Lewis |
| 4,140,889 A | 2/1979 | Mason, Jr. et al. |
| 4,320,736 A | 3/1982 | Sharon |
| D263,670 S | 4/1982 | Schawalder |
| 4,384,513 A | 5/1983 | Pierick |
| 4,446,776 A | 5/1984 | Gelfman |
| 4,528,975 A | 7/1985 | Wang |
| 4,598,634 A | 7/1986 | Van Horn, II |
| 4,608,917 A | 9/1986 | Faaborg |
| 4,729,297 A | 3/1988 | Iranzadi |
| 4,857,074 A | 8/1989 | Crace |
| 4,874,396 A | 10/1989 | McLeod |
| 4,976,252 A | 12/1990 | Cianciola |
| 5,033,369 A | 7/1991 | Wu |
| 5,067,396 A | 11/1991 | Sorensen et al. |
| 5,105,725 A | 4/1992 | Haglund |
| 5,365,833 A | 11/1994 | Chen |
| 5,427,805 A | 6/1995 | Crace |
| 5,458,054 A | 10/1995 | Yu |
| 5,682,811 A * | 11/1997 | Kidushim ............ 99/400 |
| 5,682,873 A | 11/1997 | Chambers |
| 5,884,555 A | 3/1999 | Chang |
| 5,967,135 A | 10/1999 | Shariat |
| 6,024,014 A | 2/2000 | Kasai |
| 6,035,766 A | 3/2000 | Schirmer |
| 6,064,042 A | 5/2000 | Glucksman et al. |
| 6,087,634 A | 7/2000 | Cook et al. |
| 6,125,738 A | 10/2000 | Poister |
| 6,196,115 B1 | 3/2001 | Tsao |
| 6,263,784 B1 | 7/2001 | Wodeslavsky |
| 6,267,047 B1 | 7/2001 | Mosher, II et al. |
| 6,273,922 B1 | 8/2001 | Funk et al. |
| 6,289,795 B1 | 9/2001 | McLemore et al. |
| 6,363,842 B1 | 4/2002 | Lin |
| 6,389,961 B1 | 5/2002 | Wu |
| 6,393,970 B1 | 5/2002 | Wu |
| D458,078 S | 6/2002 | Lin |
| 6,405,642 B1 | 6/2002 | Morris |
| 2001/0023641 A1 | 9/2001 | Borner |
| 2002/0066373 A1 | 6/2002 | Grohs |

* cited by examiner

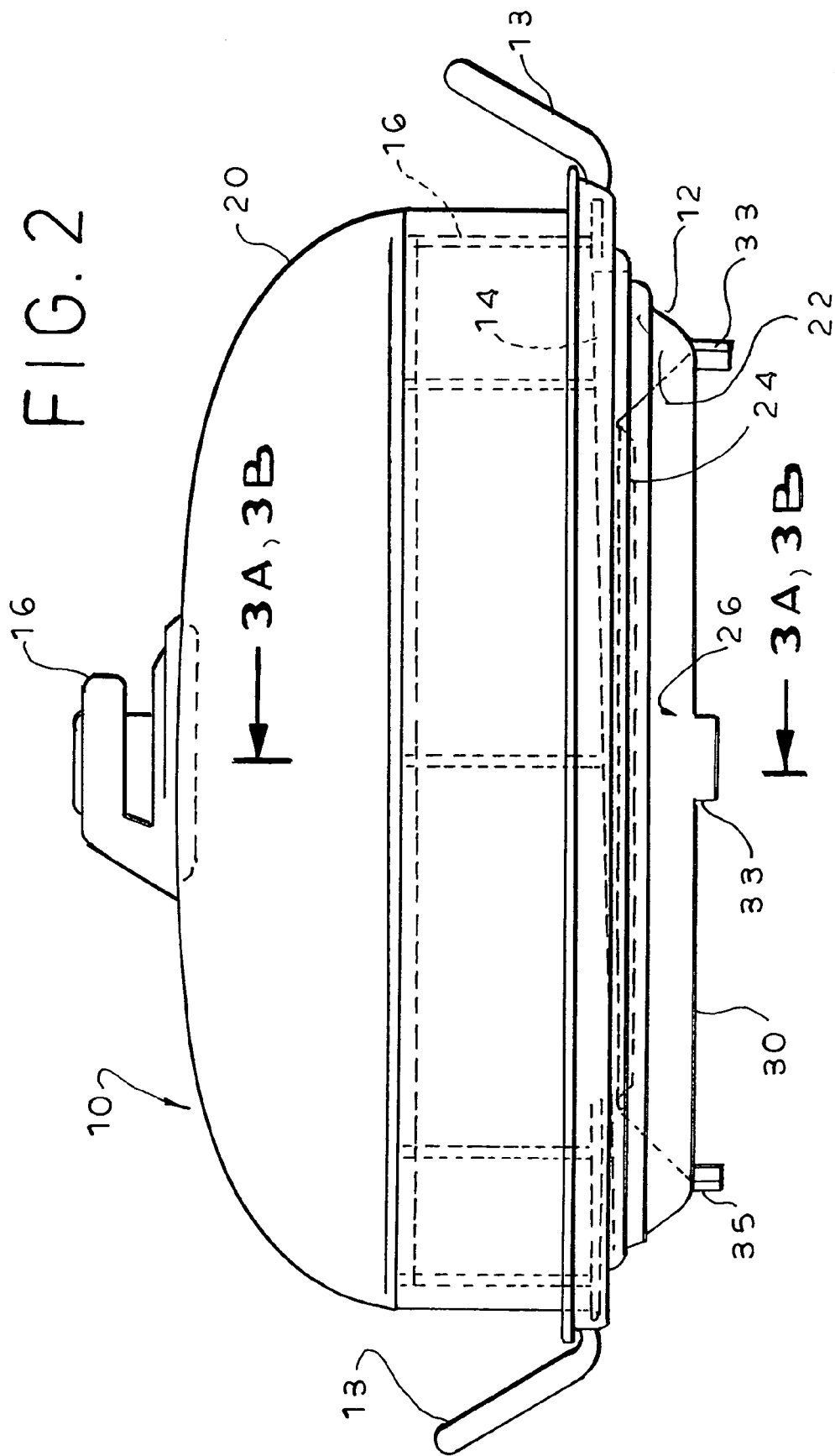

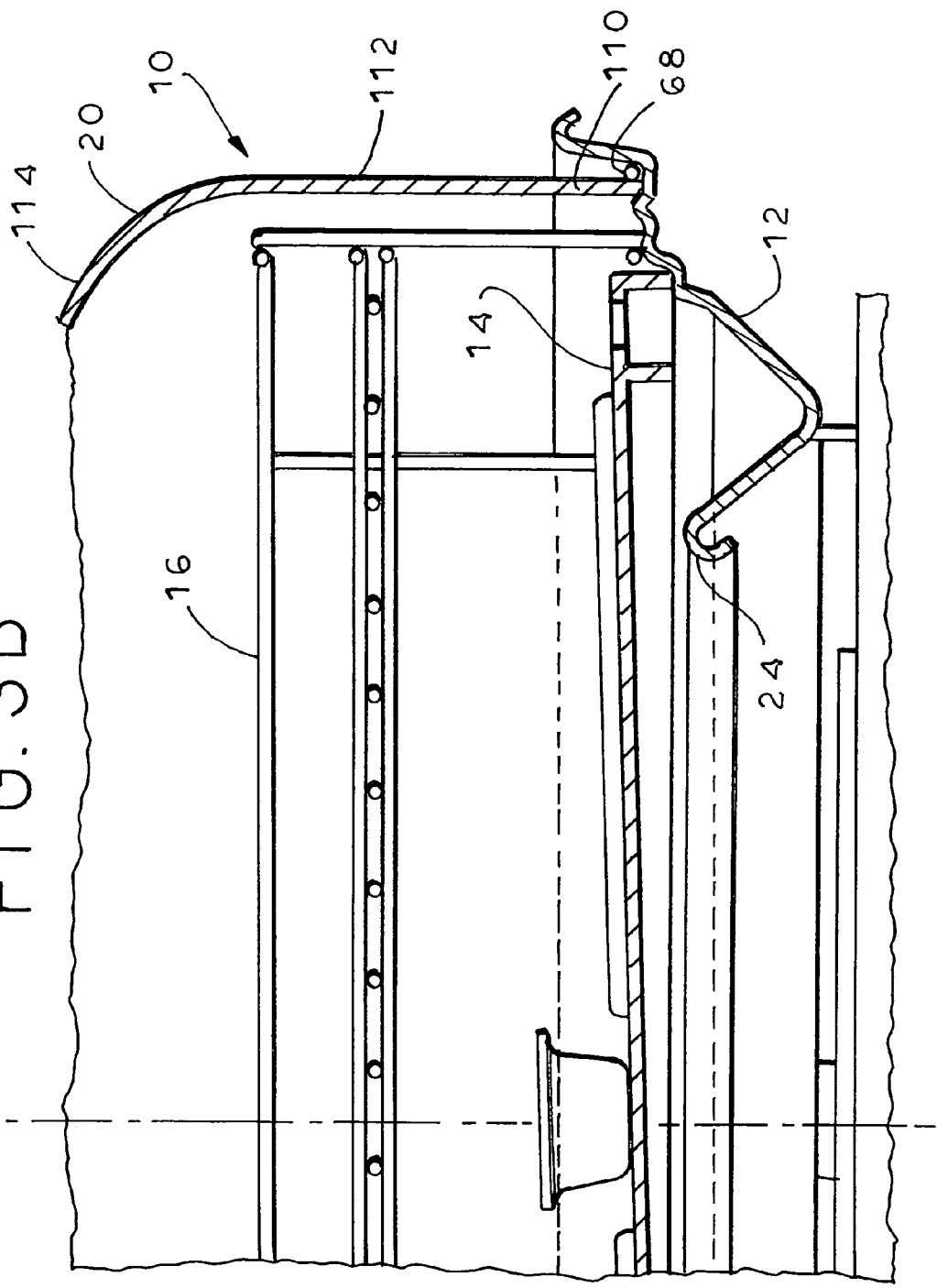

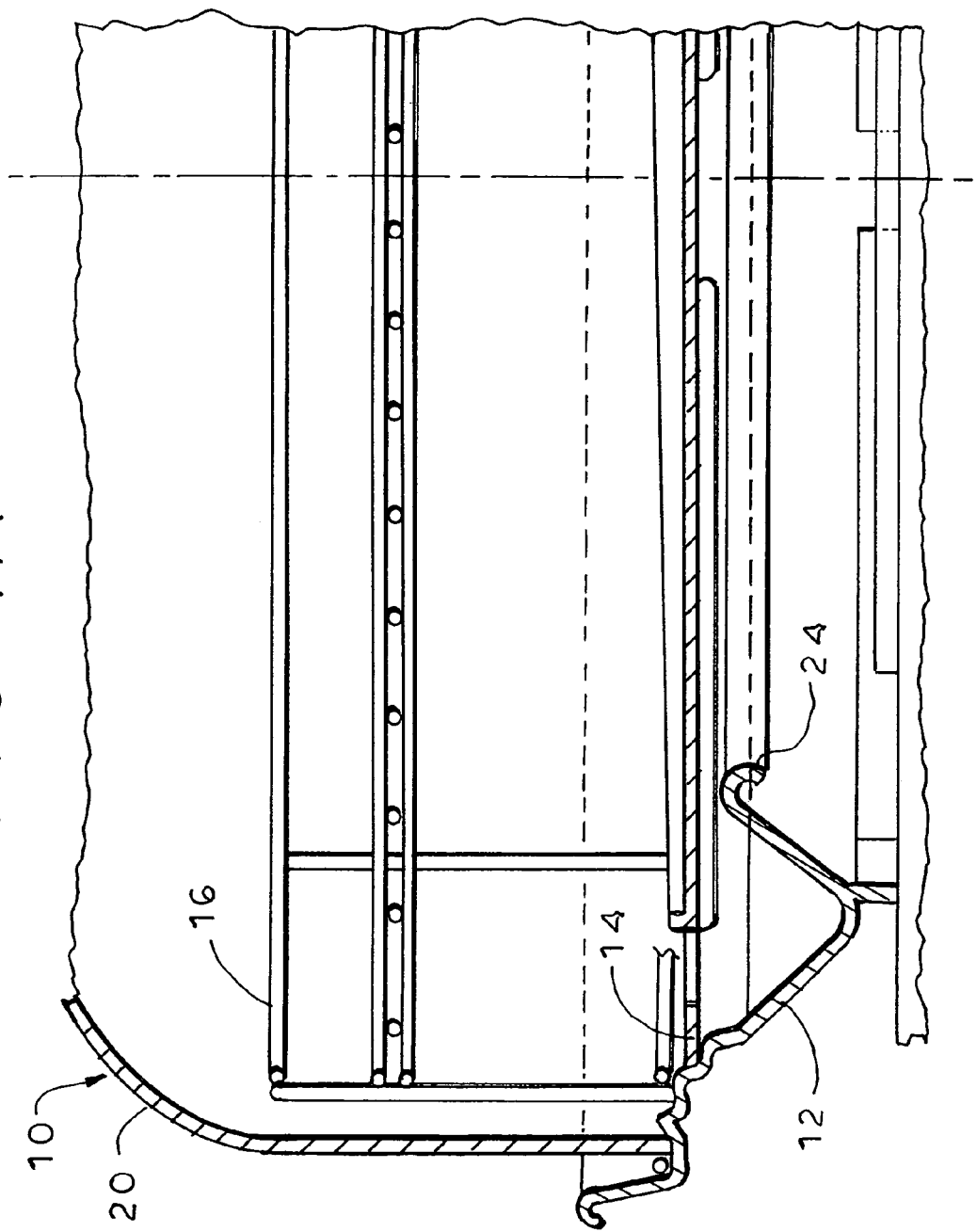

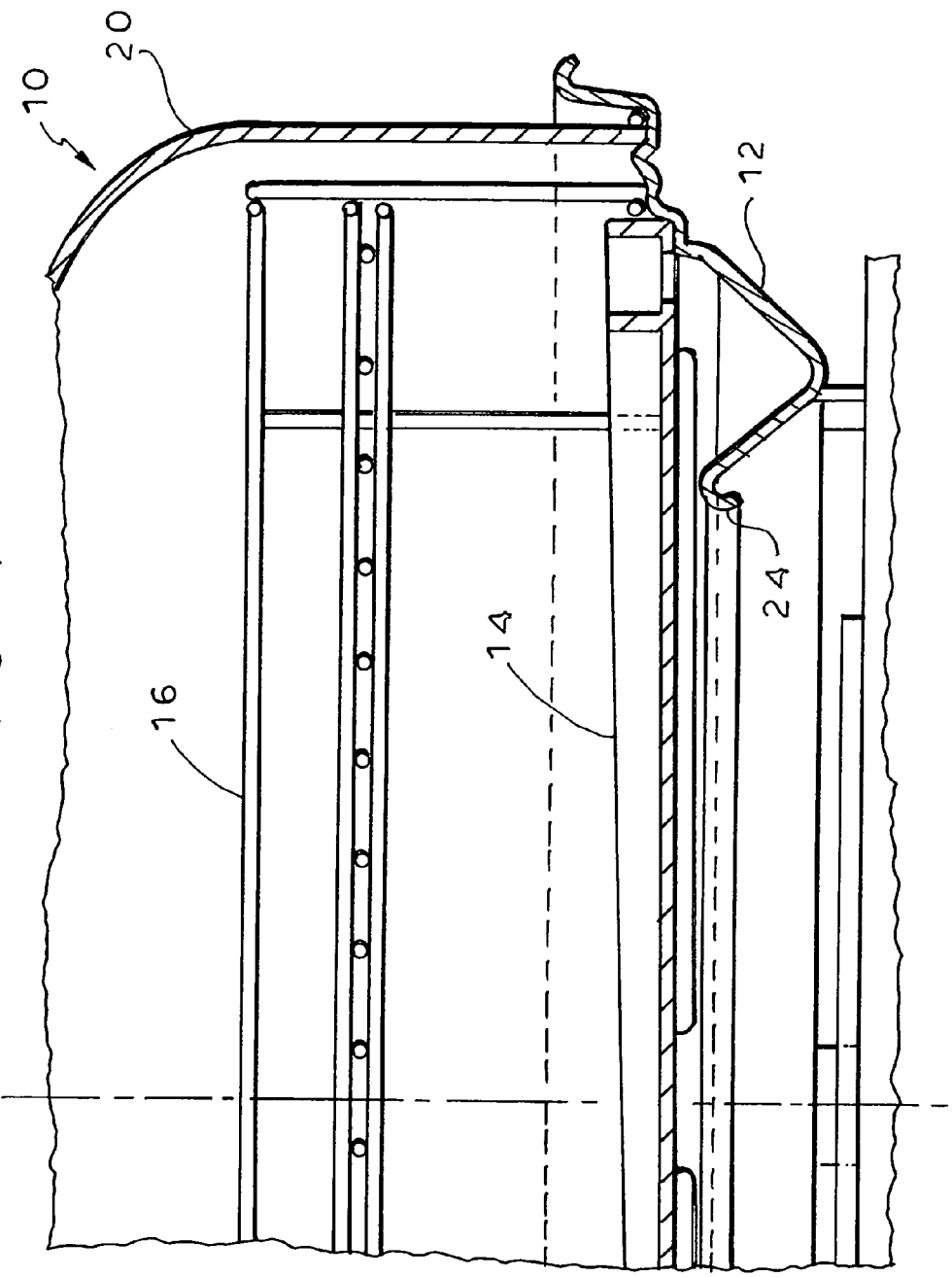

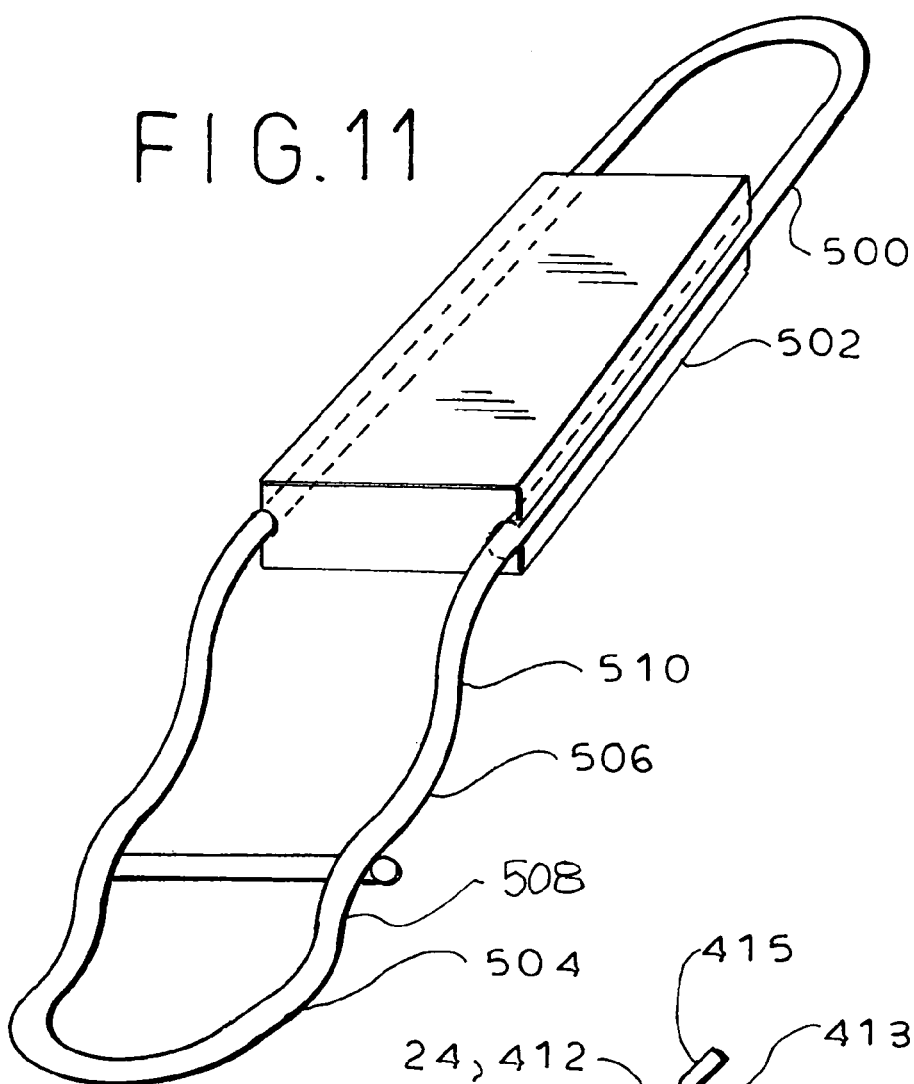
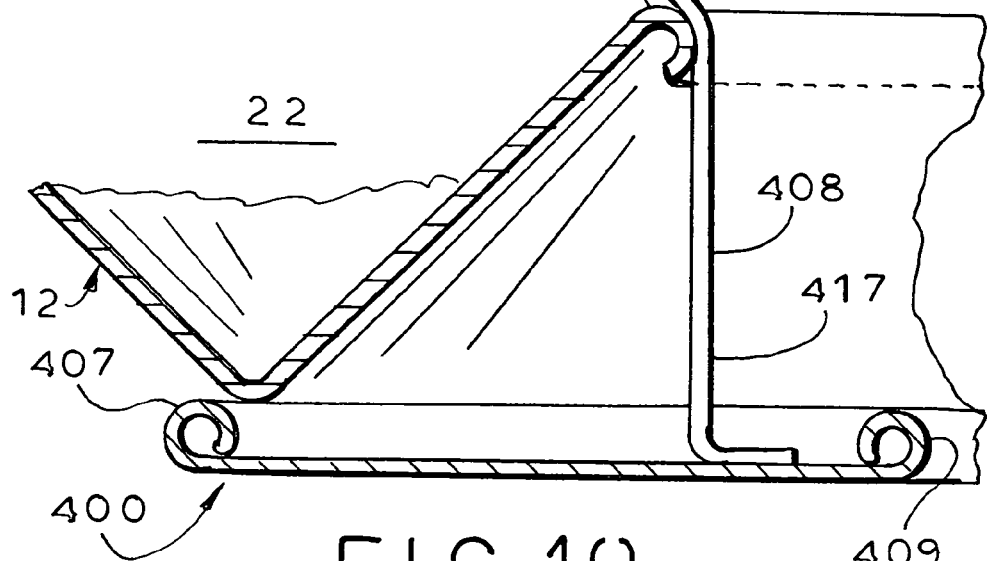

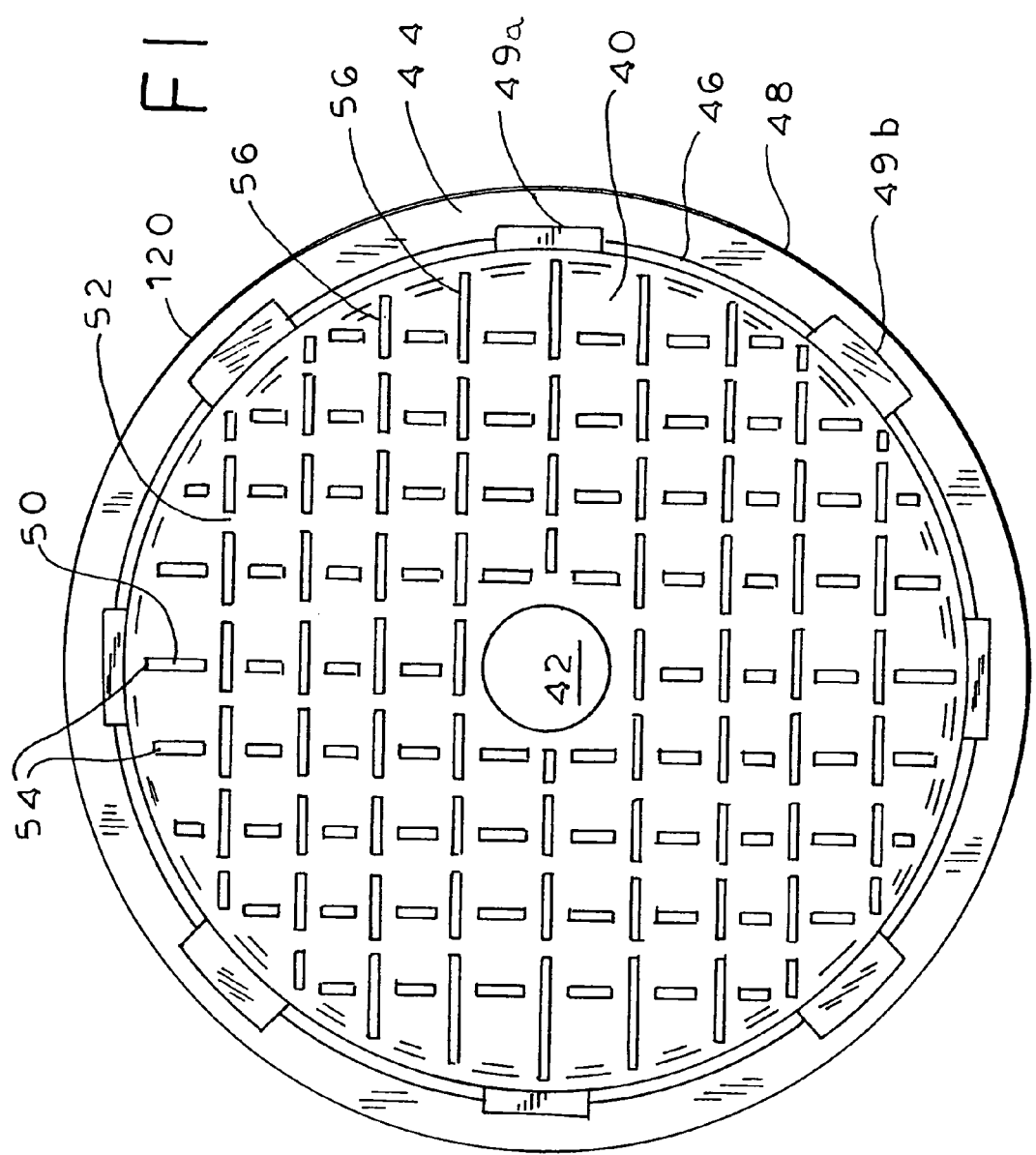

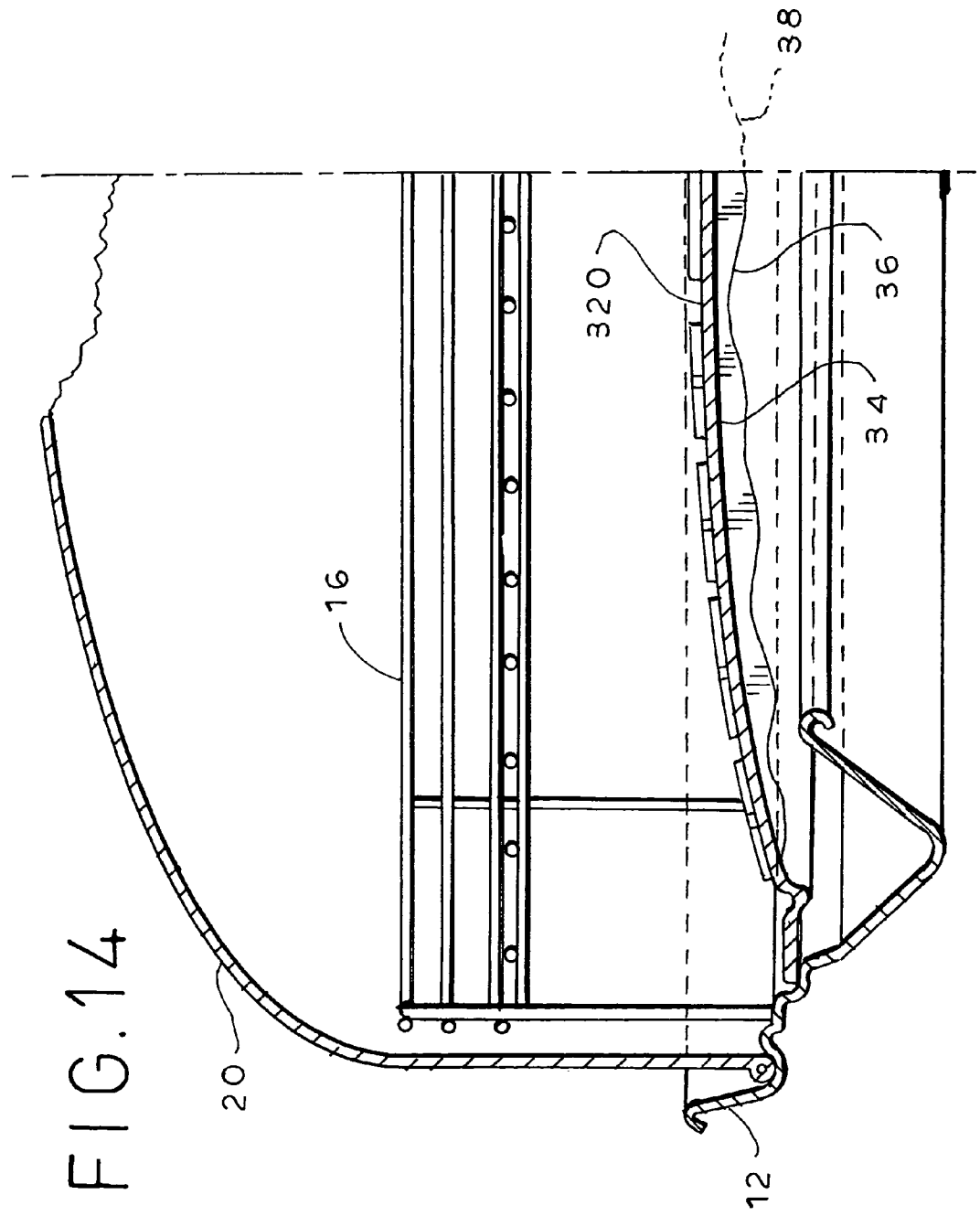

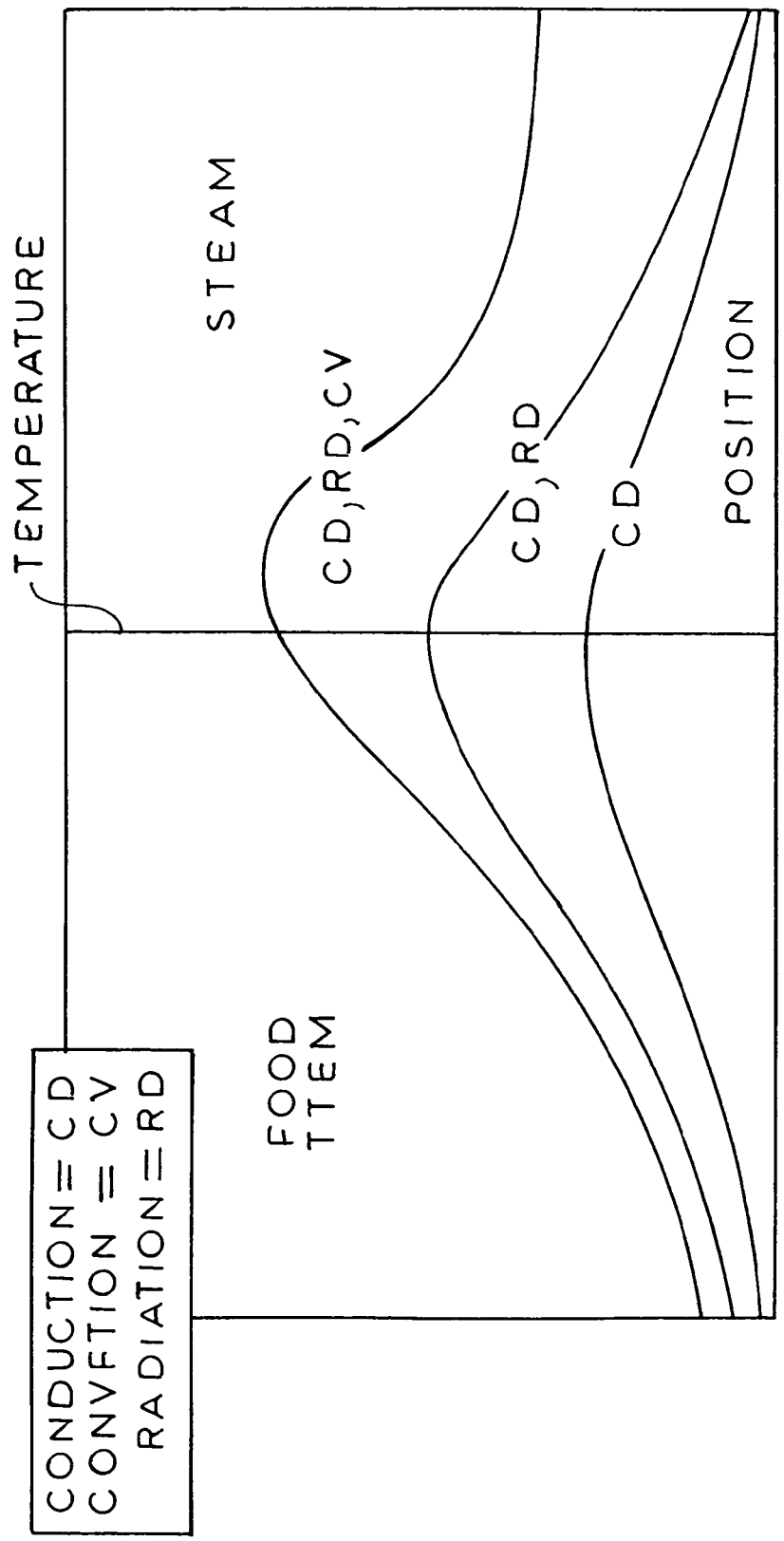

MULTI-PURPOSE STOVETOP GRILLING AND COOKING DEVICE

FIELD OF THE INVENTION

The invention pertains to the field of cooking devices, and in particular to multi-purpose cooking devices and components thereof.

BACKGROUND AND SUMMARY OF THE INVENTION

Due to the unique characteristics of different cooking methods, it is often desirable to vary cooking methods for the same or different types of food items. In addition, it is common to prepare meals with a combination of food items that each require a different method of preparation and cooking.

Grilling is a popular method of cooking food items due to the unique flavors and textures imparted to food items during the grilling process. Grilling can be performed out-of-doors with a charcoal or gas grill and can also be performed indoors with a special purpose indoor grill having a dedicated heat source. In addition, grilling can be performed indoors with a grill suitable for use with a common heat source, such as a heating element from a gas or electric range top.

Steam cooking has been long practice in many cultures. For domestic kitchen cooking, food has been typically steamed by placing it in a vessel in which the food is supported above a supply of water which is caused to boil and generate steam to envelop and cook the food. For that purpose, perforated racks, collanders, metal strainers and the like have been used to support the food above the water. Although some prior art multi-purpose cooking implements have been provided which cook or bake food by means of convection air and wherein moisture is added to the cooking area to prevent the food from drying out, most of these prior art implements do not have the ability to cook food by means of steam.

Failure to provide efficient multi-purpose cooking implement allowing for steam cooking has proven to be most unfortunate since steam is a considerably more effective heat transfer medium than hot air. This is due at least in part to the fact that the latent heat of vaporization needed to turn water into steam requires a great deal of thermal energy. When steam is allowed to condense on a food product, this thermal energy is given up directly to the food product hence considerably speeding up the cooking process. An additional benefit of cooking food products with steam is, of course, that it prevents drying up of the food products as would occur if the food products were cooked with dry, hot convection air.

Hence, although the prior art is replete with various types of multi-purpose cooking implements, there still exists a need for an improved cooking device having the ability to employ heat from a common cooking heat source for use in grilling food items while separately or simultaneously cooking other food items by convection, steaming or other methods.

The present invention satisfies the need for such an improved cooking device and comprises a base, a reversible cooking plate, (or separate grill and griddle plates), a rack and a lid. The rack and lid rest upon and are supported by the base. The base includes an annular reservoir surrounding a center opening which opening is aligned with the heat source (e.g., a gas or electric heat source on a range top).

In a preferred configuration, a reversible cooking plate is supported by the base or the rack with alternatively a grilling surface or a griddle surface directed upwardly. In another configuration, a cooking plate is supported by the base and a separate griddle plate is supported by the rack a distance above the cooking plate.

The combination cooking plate may have, on one side, an inclined grilling surface with raised ribs and, on the other side, a horizontal, flat griddle surface. The cooking plate includes a plurality of through holes in a peripheral region which, when the cooking plate is placed upon the base, are aligned over the annular reservoir of the base. As discussed in detail below, the through holes provide passageways for liquid to drain into the reservoir and provide a convenient means to lift and place the cooking plate. Further, the cooking plate includes a drainage channel in the peripheral region, outside the grilling surface for directing liquid and fat toward the through holes and into the reservoir of the base.

The rack has a preferably substantially flat food item support surface that can be comprised of a grid of wires, a perforated plate, or the like. The rack includes supports that extend downwardly from the food item support surface and rest upon a rack supporting surface of the base which is located outside (i.e., radially outwardly) of the grill supporting surface. Thus the rack is placed on the base after the cooking plate, and does not interfere with the cooking plate. When the rack is placed upon the base, the food item support surface is located a distance above the cooking plate.

The lid has a substantially cylindrical side wall, a dome top and may have a combination handle and steam release valve in the center. The lid has a height sufficient to provide clearance between the interior surface of the lid and the rack, when the rack and lid are placed upon the base. This configuration provides a desirable oven-like, convection and/or steaming cooking environment.

The cooking device provides the ability to perform direct contact grilling and griddle cooking of food items, simultaneously or separately with other types of cooking methods, indoors on a conventional stove or in any other suitable cooking environment using any suitable source of heat. The base holds food items placed on the cooking plate at an optimum distance from the heat source and is supported a distance above the housing of the heat source to permit air flow to the heat source and into the cooking device and to reduce the possibility of heat damage to the housing of the heat source. The reservoir of the base holds liquid in the reservoir to create desirable moisture within the cooking device and to prevent flare-up of liquids and fats captured in the cooking process.

Further, a substantial amount of the heat and moisture produced in the cooking process may be retained within the enclosure and reservoir. This improves the cooking efficiency of the device and the quality of the food. It also selectively allows for cooking in a steam cooking mode. Furthermore, the configuration of the cooking tool permits latitude of selection between the extent to which certain foods are cooked by conduction of heat with relationship to the extent the food is cooked by direct condensation of water vapor thereupon.

In addition, the cooking plate is configured to efficiently transfer heat from the heat source to the food items and to impart, when desired, the appearance created by traditional grilling. Further, the easily removable rack and the griddle plate employ the enclosed heat and moisture produced in the cooking process to permit the cooking of other food items simultaneously with or separately from food items prepared on the cooking plate. The cooking device is also configured to reduce the amount of fats and oils in prepared foods thereby providing a health benefit.

In accordance with the present invention, the cooking plate may also be used independently as a cooking adaptor positionable on various types of supporting surfaces. The adaptor is configured so as to provide a cooking surface that is slanted relative to the supporting surface on which it is rested. Also, the adaptor is provided with a drainage aperture extending therethough for allowing drainage of fluids away from the cooking surface.

Liquids generated as by-products of the cooking process are biased by the slant in the cooking surface towards the drainage aperture. A suitable container may be positioned to collect the discharged liquids. The collected liquids may be re-circulated in various forms such as with the proposed cooking device or remain in the container for latter processing.

For example, the adaptor may be removably positioned on the grill of a conventional barbecue appliance with the discharge aperture positioned for collecting the by-products of the cooking process within a container located away from the barbecue. This configuration prevents the liquid by-product of the cooking process from falling through the grill of the barbecue onto the coals or other components of the barbecue, hence reducing the need for cleaning and maintenance.

The cooking surface of the adaptor may be provided with ribs generating markings on the cooked food products similar to that generated by the grill of a conventional barbecue. The ribs may also serve to space the food products from the remainder of the cooking surface for facilitating the release of liquid by-product of cooking from the food.

The adaptor may optionally be provided with flow guiding means and/or flow slowing means for respectively guiding and/or slowing the flow of liquids towards the discharge aperture.

The adaptor may also optionally be provided with heat transfer and/or thermal inertia enhancing means for respectively enhancing the transfer of heat from the heat source to the food and/or the thermal inertia of the adaptor.

The adaptor may further optionally be provided with valve means for selectively allowing and preventing the flow of fluids through the discharge aperture.

The adaptor may still further optionally be provided with an angle adjustment means for allowing adjustment of the angle between the cooking surface and the supporting surface when the adaptor rests on the supporting surface.

The adaptor may yet still optionally be provided with manipulation facilitating means for facilitating the manipulation thereof.

In a preferred embodiment of the invention, the adaptor has a substantially dihedral configuration defining a substantially opposed second cooking surface having different cooking characteristics. Typically, the adaptor is configured so as to be reversible for selective usage of the first or second cooking surface.

The adaptor is also typically configured so that the first and second cooking surfaces respectively extend in substantially angled and parallel relationships relative to the supporting surface when the adaptor is rested on the supporting surface. Typically, the slant of the first cooking surface is provided by a rim extending peripherally from the second cooking surface and the rim typically acts as a flow retaining barrier for the second cooking surface.

BRIEF DESCRIPTION OF THE DRAWINGS

For a complete understanding of the above and other features of the invention, reference shall be made to the following detailed description of the preferred embodiments of the invention and to the accompanying drawings, wherein:

FIG. 2 is a side assembly view of the device of FIG. 1;

FIGS. 3A and 3B are fragmentary elevation views taken along lines 3A–3B and 3A–3B, respectively, of FIG. 2, showing the cooking plate in a first orientation;

FIGS. 4A and 4B are fragmentary elevation views showing the cooking plate in a second orientation;

FIG. 10 is a fragmentary elevation view, taken along line 10—10 of FIG. 9;

FIG. 11 is a perspective view of a lifting device;

FIG. 12 is a plan view of a second embodiment of the cooking plate of the present invention;

FIG. 14 is a fragmentary elevation view of the cooking device showing a third embodiment of the cooking plate.

FIG. 17 is a schematic diagram of the temperature profiles at the food item/steam interface.

DETAILED DESCRIPTION OF THE DRAWING

Figure 1:
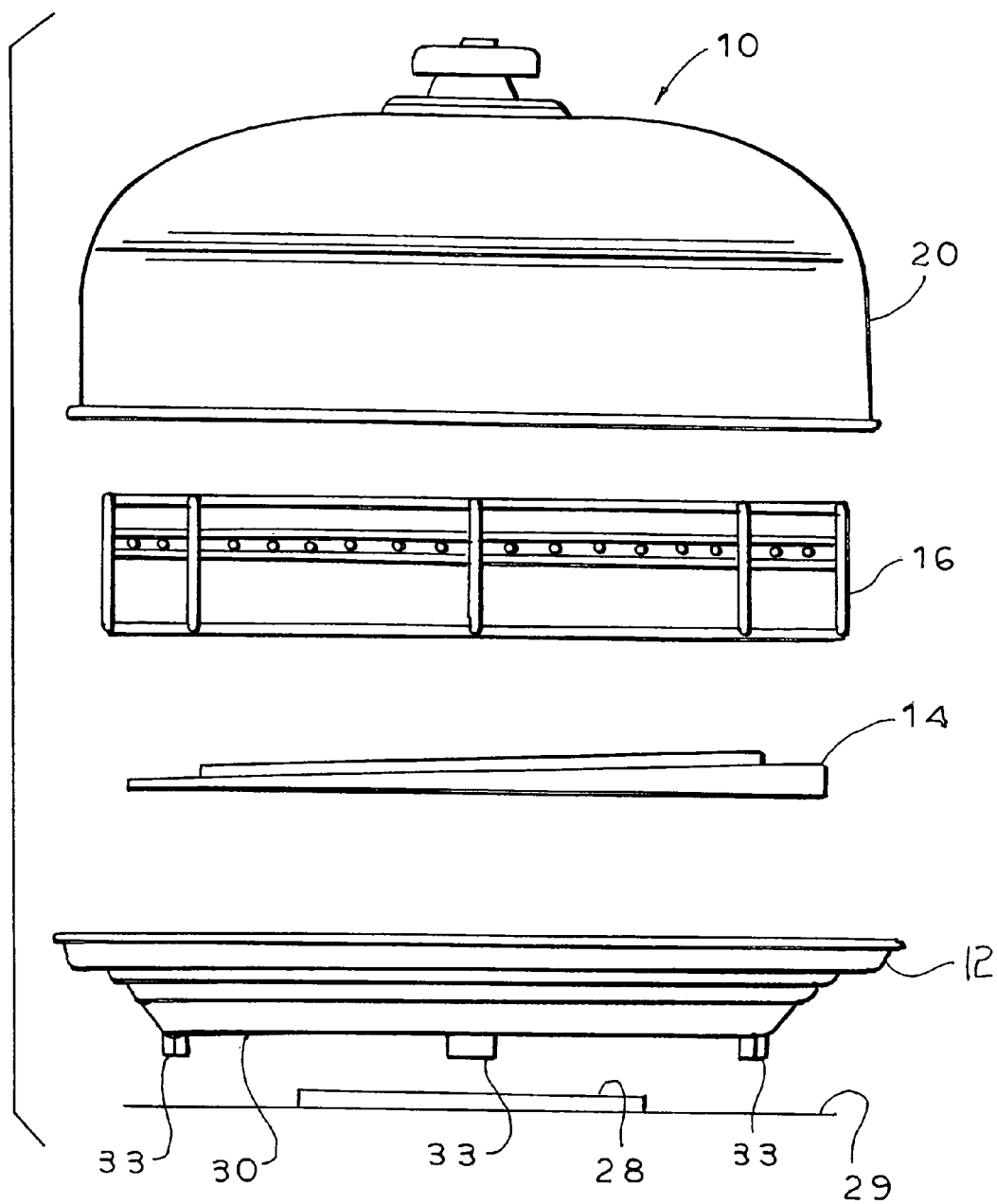
FIG. 1 is an exploded view of the cooking device of the present invention.
Figure 3A:
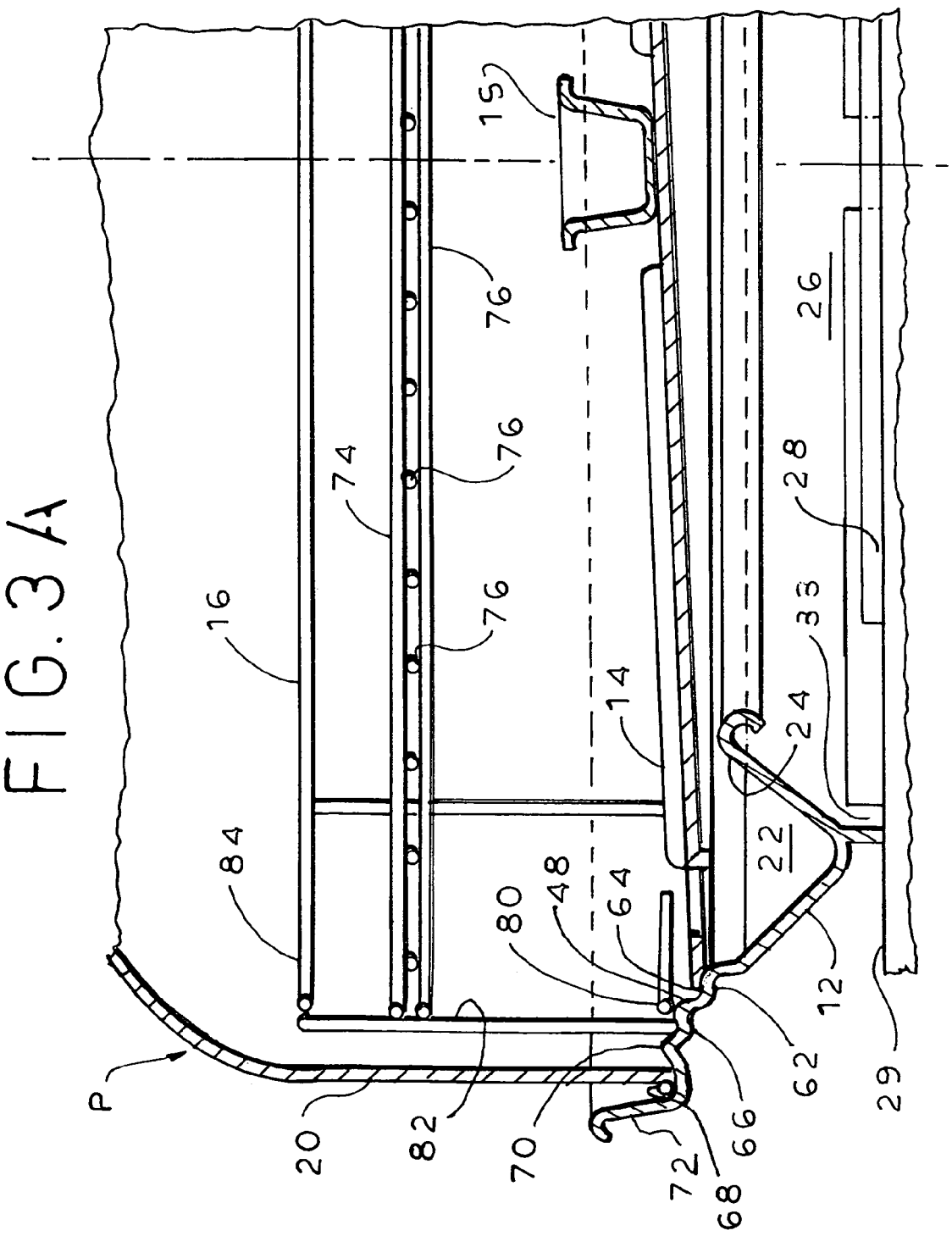

Referring to FIGS. 1–4B, a first embodiment of the cooking device 10 of the present invention comprises a base 12, a cooking plate 14, a rack 16 and a lid 20. As depicted, the base 12 forms a support for each of the cooking plate 14, rack 16, and a lid 20.

The components of the cooking device 10 can be used both in various combinations and with other components not part of the device as required for the cooking task at hand. For example the cooking plate 14 can be used directly with various heat sources such as conventional charcoal or gas grills and the like. The cooking plate 14 can also be used simultaneously with or separate from the rack 16, and vice versa.

In any configuration, the lid 20 may or may not be used. However, it is expected that the lid 20 will be used in a majority of situations due to the significant amount of heat and moisture selectively retained within the cooking device 10 by the lid 20 during the cooking process. Selective retention of heat and moisture by the lid 20, in turn, allows the cooking device 10 to be used both for convection and steam cooking in addition to others modes of cooking such as grilling and frying.

The base 12 includes a reservoir 22 forming a substantially closed perimeter encompassing an opening 26. Preferably, the reservoir 22 has a substantially symmetrical and rounded configuration such as an annular configuration. Alternatively, the reservoir may have substantially the configuration of a polygonal frame, a rectangular frame, a rhomboid frame or any other suitable configuration without departing from the scope of the present invention.

The reservoir 22 is bounded inwardly by an inside rim 24 delimiting the opening 26. The opening 26 is aligned with a heating element such as a gas or electric heating element 28 of a range top when in use.

The reservoir 22 has a substantially concave cross-sectional configuration for retaining fluids therein. Typically, the reservoir 22 has a substantially syncline cross-sectional configuration, a U-shaped cross-section or, as depicted, a rounded V-shaped cross section.

Preferably, the base 12 includes a support element or elements to raise the bottom 30 of the reservoir 22 a predetermined distance above a support surface, such as the housing 29 of the range top. Such support elements can include feet 33 disposed at substantially regular intervals (e.g., 90 degrees) around the bottom 30 of the reservoir, or other similar discreet or continuous support elements.

The purpose of the support elements for the base 12 include providing for desirable air flow between the base 12 and the housing 29 for the heating element 28 and convection currents within the cooking device, and reducing or eliminating the likelihood of heat damage to the stove-top housing due to the possibly elevated temperature of the base 12 of the cooking device 10. The support elements can be formed integrally with the base 12 (e.g., stamped) or can be formed from independent material and affixed to the base.

The reservoir 22 serves a first purpose of collecting and containing liquids released by food during the cooking process, thereby aiding in the cleaning of the cooking environment and utensils. A second purpose of the reservoir 22 is to provide a source of heated moisture allowing for steam cooking and overall enhancing the cooking process. Specifically, liquid, such as water, may be added to the reservoir 22 before or during the cooking process to provide moisture within the cooking device 10 and/or to flavor the food items within the device 10.

It can be appreciated that the liquids released by the food items during the cooking process may re-circulate through the cooking device after collecting within the reservoir 22 and being heated by the heating element 28. Specifically, moisture and flavors released from the heated reservoir 22 may travel upwardly via through holes (not shown) in the cooking plate 14 into a volume bounded (at least partially) by the cooking plate 14 and the lid 20. Alternatively, moisture and flavors emanating from the heated reservoir 22 may travel upwardly around the peripheral edges of the cooking plate 14. It can also be appreciated that the liquid (e.g., water) within the reservoir 22 also reduces the likelihood of combustion or "flare-ups" of fats and oils within the reservoir 22.

To further enhance the flavors imparted to cooked food items, aroma producing substances may be placed within smoker cup 15 located on the cooking plate 14. Alternatively, the reservoir 22 may be provided with partition walls (not shown) formed therein for partitioning the reservoir 22 into reservoir sections. The partition walls may take any suitable form including transversally extending partition walls for forming sector-like reservoir sections and/or circumferentially extending partition walls for forming circumferential reservoir segments. Various aroma producing substances may be selectively placed in specific reservoir sections to produce desired culinary effects while other reservoir sections may be dedicated to receiving by-products of the cooking process.

Handles (not shown) are typically affixed to the base 12 for facilitating handling of the cooking device 10. Although the handles shown throughout the Figures are of the "U"-shaped type and are diametrically disposed relative to each other, it should be understood that any suitable type of handle may be used in any suitable location without departing from the scope of the present invention.

The heating element 28 directly and indirectly heats the base 12 (and thus any liquid in the reservoir 22) and the cooking plate 14 in a relatively direct manner—that is, by at least direct radiant heating and direct convection heating. In certain instances, the cooking device may be configured and sized such that the heating element 28 also transfers heat to the cooking plate 14 by conduction.

The base 12 typically includes a circumferential cooking plate supporting surface 60 located radially outwardly from the reservoir 22 upon which the cooking plate 14 rests when the cooking plate is mounted upon the base. The cooking plate supporting surface 60 typically has a substantially annular or otherwise suitably-shaped configuration depending on the configuration of the cooking plate 14.

The cooking plate supporting surface 60 is preferably located in substantially the same horizontal plane as the inside rim 24 of the reservoir 22, or slightly thereabove. An annular or otherwise suitably shaped cooking plate retaining surface 64 of the base 12 is located radially outwardly from the cooking plate supporting surface 60 and has a radius sized to closely receive the peripheral edge 48 of the cooking plate 14 to maintain the cooking plate 14 in alignment, or in proper registration with the base 12 during use. Thus, it can be appreciated that, during use, the cooking plate 14 is securely supported above, and spans the reservoir 22 and opening 26 of the base 12.

In alternative embodiments of the invention (not shown), the cooking plate 14 may be supported by partition walls or other structures extending from the reservoir 22. In such embodiments, the cooking plate 14 may span only partially across an inner segment of the reservoir 22 allowing convection currents to flow upwardly from the reservoir 22 around the outer peripheral edge of the cooking plate 14.

The base 12 also includes an annular or otherwise suitably shaped rack supporting surface 66 located radially outwardly from the cooking plate supporting surface 60. Preferably, the rack supporting surface 66 is also located a distance, or step, above the cooking plate supporting surface 60, with an upwardly and radially outwardly extending portion of the step forming the cooking plate retaining surface 64 mentioned above.

An annular or otherwise suitably shaped lid supporting surface 68 is located radially outwardly from the rack supporting surface 66. An annular sealing rib 70 projects upwardly intermediate the rack supporting surface 66 and the lid supporting surface 68. The sealing rib 70 performs the double function of providing proper alignment of the rack 16 during use and providing a desirable seal to maintain heat and moisture within the lid 20 during the cooking process.

The base 12 further includes an outer rim 72 projecting radially outwardly and upwardly at a preferably relatively steep angle from the lid supporting surface 68. The outer rim 72 also performs a dual function of maintaining alignment of the lid 20 during use and reducing or eliminating splatter from the cooking device 10.

The rack 16 preferably includes a food item supporting surface 74 located, during use, a predetermined distance above the cooking plate 14. The food item supporting surface 74 of the rack 16 is preferably formed from a grid of wires 76 connected to a circular or otherwise suitably shaped peripheral wire at their extreme ends. However, the rack 16 and/or the food item supporting surface 74 thereof can be formed from other materials such as a perforated or solid panel, or the like.

The rack 16 also includes a circular or otherwise suitably shaped base 80 (which may be wire) connected to the peripheral wire by at least one and typically a plurality of spacing legs 82 disposed around the periphery of the rack 16 at preferably regular angular intervals. Preferably the spacing legs 82 extend above the food item supporting surface 74 and support one or more circular fence wires 84 for retaining food items on the food item supporting surface 74. The base 80 of the rack 16 is in contact with the rack supporting surface 66 of the base 12, when the rack 16 is properly mounted thereon.

The lid 20 of the cooking device 10 has a circular or otherwise suitably shaped rim 110 that rests upon the lid supporting surface 68 of the base during use. The lid 20 typically also has a substantially cylindrical side wall 112 and a dome or otherwise shaped top wall 114. A handle 116 is typically located at the center apex of the dome of the lid 20. The lid 20 is optionally further provided with a steam release valve. The steam release valve may be incorporated in the handle 116 such as shown in the drawings or be otherwise located.

The side wall 112 of the lid 20 has a height sufficient to provide clearance between the rack 16 and the inside surface of the lid 20 during use. Preferably, the proportionality ratios between the various sections of the lid 20 and between the lid 20 and other components of the cooking device 10 are calibrated to optimize the flow of steam within the cooking device 10 when the latter is used, at least in part, as a steamer. More specifically the height of the side wall 112 is sized to allow for the accumulation within the lid 20 of a substantial, predetermined volume of steam. The height of the side wall 112 is also typically sized to allow for condensation of the steam on the top wall 114 at a predetermined height. As will be hereinafter disclosed in greater details, the side and top walls 112, 114 are typically configured and sized for inducing at least one substantially predetermined steam re-circulation pattern within the cooking device 10

Figure 5:
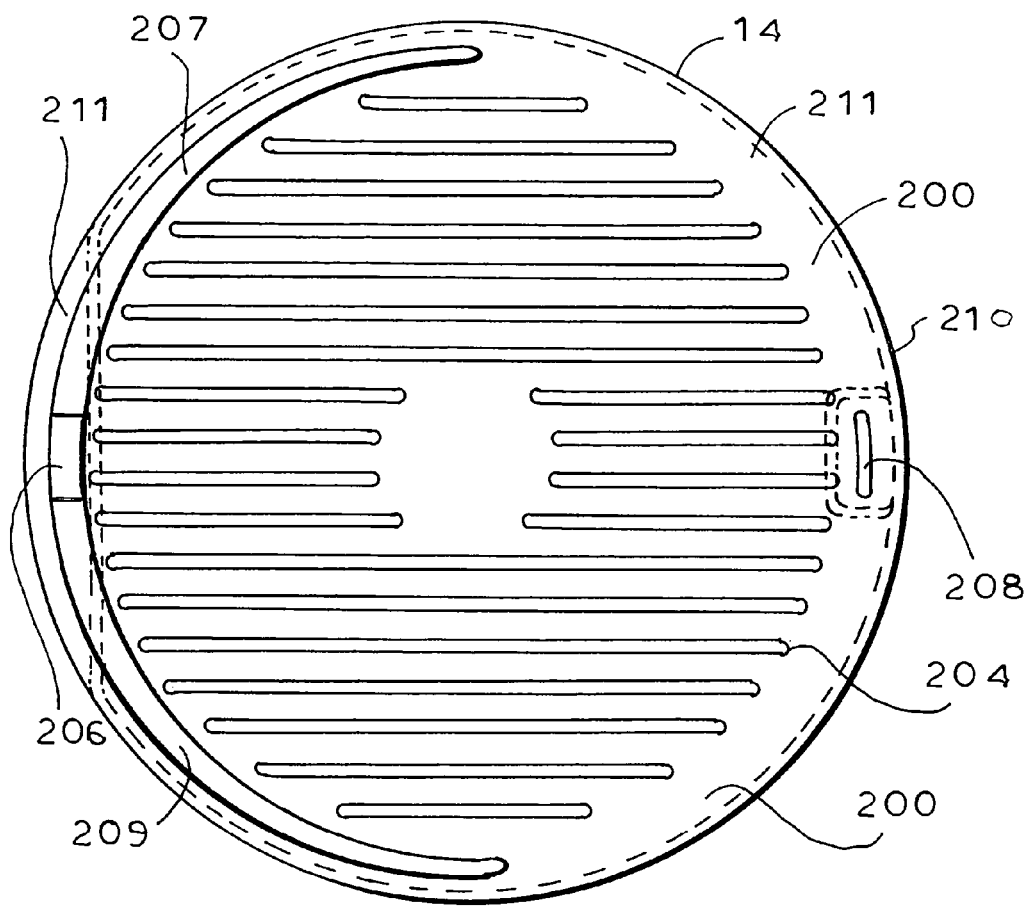
FIG. 5 is a top plan view of a first embodiment of the cooking plate of the cooking device of FIG. 1.
Figure 6:
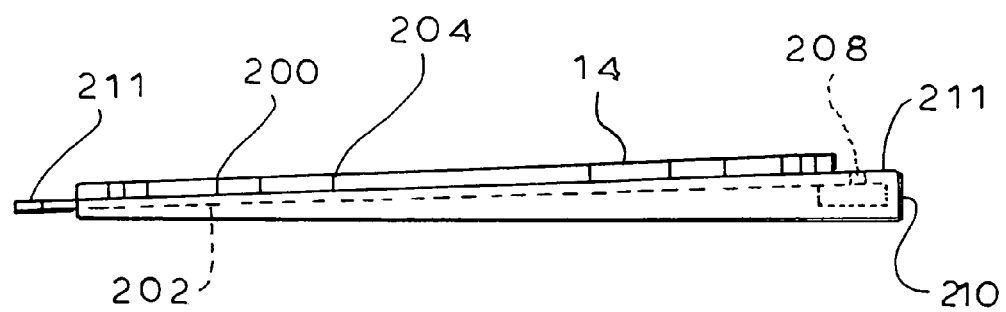
FIG. 6 is a side elevation view of the cooking plate of FIG. 5.
Figure 7:
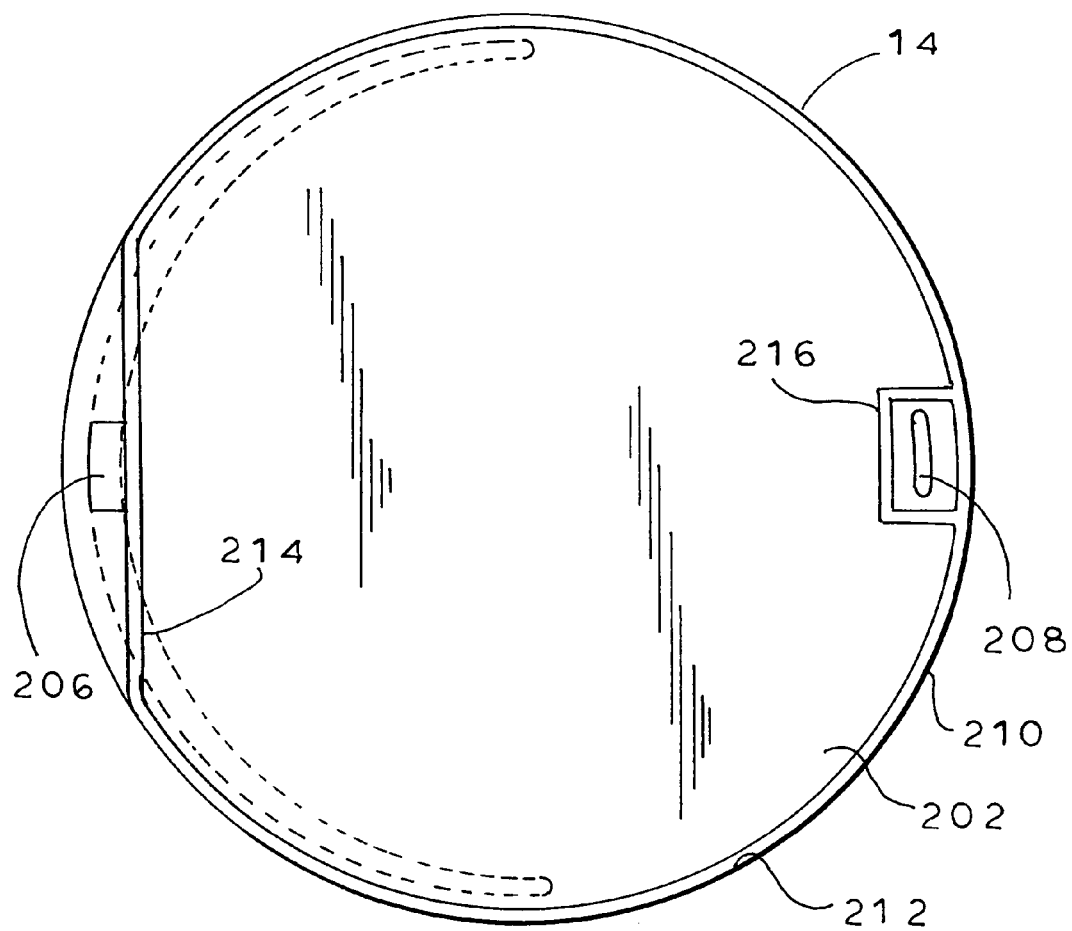
FIG. 7 is a bottom view of the cooking plate of FIG. 1.

Referring to FIGS. 5–7, a first embodiment of the cooking plate 14 is substantially disk-like or otherwise suitably shaped, having a perimeter substantially equal to the cooking plate supporting surface 60 of the base 12. The cooking plate 14 has a so-called grilling surface 200 on one side and, preferably, a so-called griddle surface 202 on the opposite side. At least one and preferably a plurality of elongated, parallel raised ribs 204 are disposed on the grilling surface 200 at substantially equal intervals. The ribs 204 may be rectilinear in shape.

The cooking plate 14 includes first and preferably second through holes 206, 208 typically adjacent to, but set back from a peripheral edge 210 of the cooking plate 14. Preferably, the through holes 206, 208 are substantially diametrically opposed relative to each other along a direction substantially parallel to the ribs 204.

The cooking plate 14 has a typically arcuate first drainage aperture or channel 207 that extends adjacent the peripheral edge 210 on the grilling surface 200 to the first through hole 206. Typically, although by no means exclusively, the drainage channel 207 describes an arc of about 90 degrees. A second arcuate drainage channel 209 typically extends in a similar fashion along the peripheral edge 210 to the first through hole 206 from an opposite direction. A substantially planar annular peripheral region 211 is disposed radially outwardly from the drainage channels, on the grilling surface 200.

The cooking plate 14 may include a user-operable valve (not shown) operatively coupled to the discharge aperture for selectively permitting, preventing or controlling the flow of liquid through the through hole 206. The valve may include an aperture plug releasably mountable over the discharge aperture for selectively obstructing the latter. Alternatively, the valve may include a valve plate movably coupled to the cooking adaptor for movement between a first valve position wherein the valve plate is in register with the discharge aperture so as to prevent the flow of said liquids therethrough and a valve second position wherein the valve plate is at least partially retracted from the discharge aperture so as to allow the flow of the liquids therethrough.

A beveled structure, which may be in for form of a rim 212, or other such structure, extends substantially perpendicularly from the griddle surface 202 of the cooking plate 14 for supporting the cooking plate 14. The majority of the rim 212 preferably substantially follows the peripheral edge 210 of the cooking plate 14. However, a linear, secant section 214 of the rim 212 extending typically along a secant of the cooking plate 14 crosses an interior portion of the griddle surface 202 adjacent the first through hole 206, and intermediate the first and second through holes 206, 208.

The rim 212 preferably varies in height gradually from a minimum (or nadir) on one side of the cooking plate 14 to a maximum (or apex) on the opposite side of the cooking plate 14 such that, when the grill plate 14 is supported on a horizontal surface by the rim 212 (e.g., when supported by the base 12), the grilling surface 200 is slanted or inclined, with the nadir proximal to the support surface and the apex distal to the support surface. Typically, although by no means exclusively, the angle of inclination is between about 2 and about 25 degrees from the horizontal plane.

Preferably, the lowest portion of the rim 212 is the secant portion 214, which secant portion 214 may have a constant height along its length. The highest portion of the rim 212 is directly across the cooking plate 14, adjacent the second through hole 208. The desired variation in height of the rim 212 can be achieved if the height of the rim 212 increases from the minimum value as a (linear) function of the perpendicular distance from the lowest portion of the rim 212 (i.e., the secant portion 214).

It can be appreciated that when the cooking plate 14 is supported on the annular cooking plate supporting surface 60 of the base 12, the first through hole 206 is aligned above the reservoir 22 of the base 12. The grilling surface 200 is aligned at an incline and any fluids produced by food on the grilling surface 200 flow downwardly between the ribs 204, into and along the arcuate channels 207, 209, through the first through hole 206 and into the reservoir 22. Thus, undesirable cooking fluids such as grease and fat will be quickly and efficiently removed from the food item providing for a healthy grilling process.

When the cooking plate 14 is supported on the base 12 with the griddle surface 202 facing upwardly, the annular peripheral region 211 of the grilling surface 200 contacts the annular cooking plate supporting surface 60 of the base, and in this orientation the griddle surface 202 is aligned horizontally (i.e., parallel to the support surface upon which the base 12 rests.)

In this orientation, the rim 212 extends upwardly from the griddle surface 202 and forms a contiguous barrier to contain liquids (such as liquid pancake mix, eggs, and the like) on the griddle surface 202 during cooking. To this end, a barrier 216 connected to the rim 212 preferably partially surrounds the second through hole 208 and connects to the rim 212, thereby preventing liquid egress through the second through hole 208. Preferably, the height of the barrier 216 adjacent rim 212 is equal to or less than the height of the rim 212 at that point such that the barrier 216 permits the cooking plate 14 to properly rest on the rim 212. It can be appreciated that the secant portion 214 of the rim 212 similarly prevents liquids from flowing into the second through hole 208.

While the rim 212 is preferably in the form or a contiguous wall to form a barrier when using the griddle surface 202, it can be appreciated that other configurations and combinations of structures are, such as discrete, spaced-apart beveled structures (e.g., individual support posts), which may be combined with a separate containment wall or other suitable structure. Preferably, such spaced-apart beveled structure permits vapor from the reservoir or support surface to pass around the periphery of the plate 14.

Figure 8:
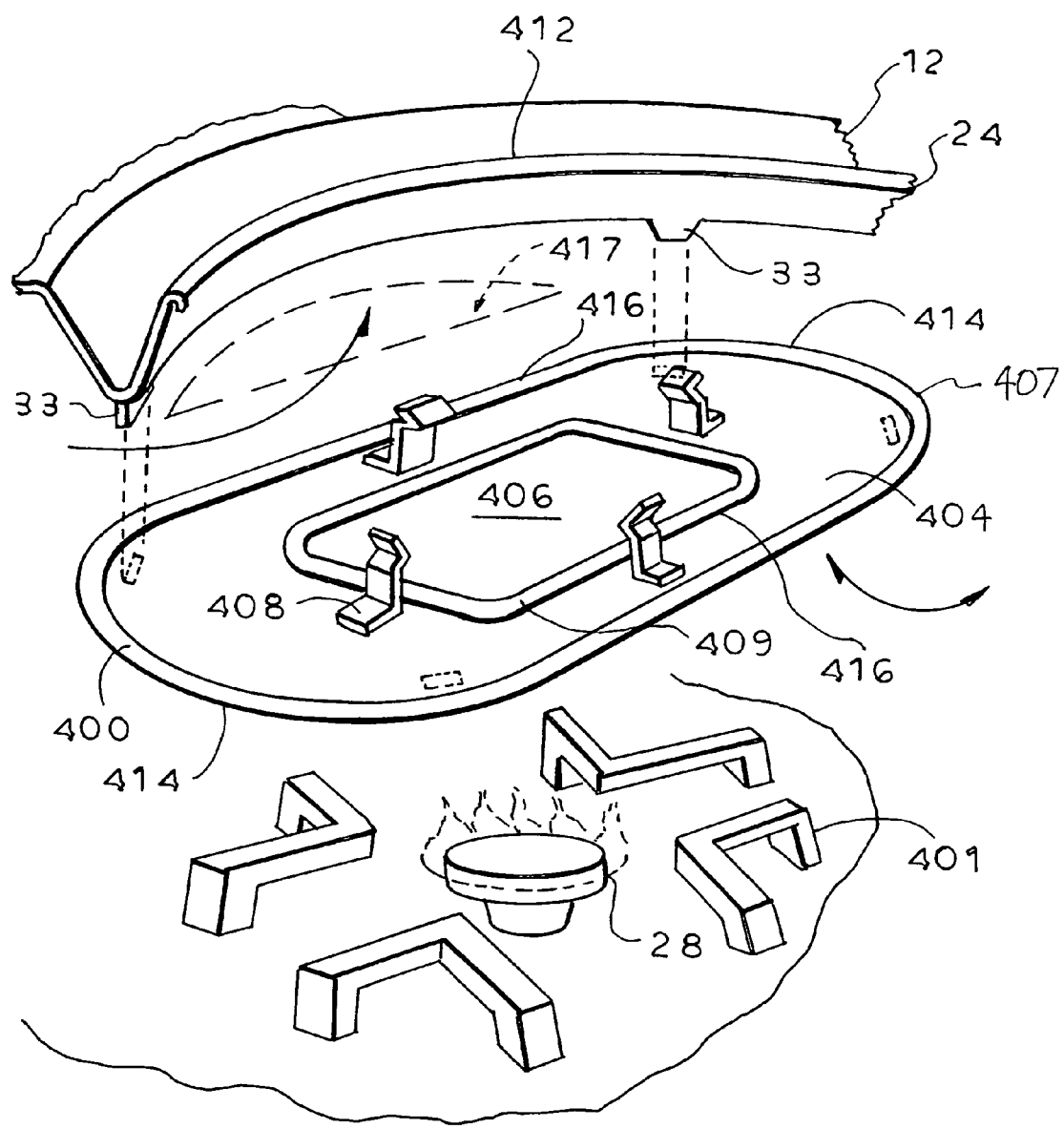
FIG. 8 is a partial exploded view of the cooking device of the present invention showing a supplemental support.
Figure 9:
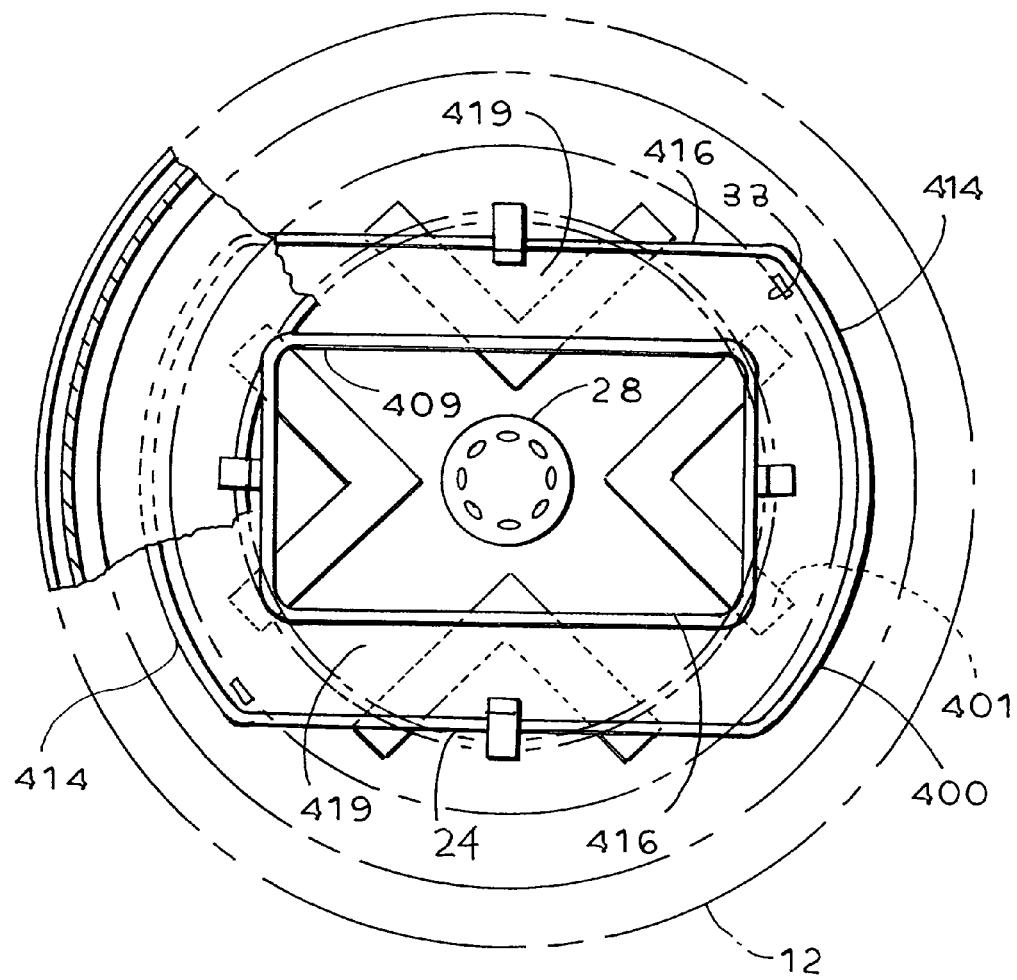
FIG. 9 is a top plan assembly view of the base and supplemental support, on a gas range.

Referring to FIGS. 8–10, an optional removable supplemental support attachment 400 can be releasably connected to the base 12 to allow the cooking device 10 to be placed upon support surfaces of various configurations. The support attachment 400 is most suitable for placing the cooking device 10 upon a gas range with discrete support elements 401 (as depicted).

The support attachment 400 includes a substantially planar base portion 404 having a circumferential rib 407, and includes a center through opening 406 bounded by an internal rib 409. A number of resilient attachment clips 408 (preferably 4) are affixed to a top surface of the support attachment 400 for releasably securing the support attachment 400 to the base 12.

When the support attachment 400 is properly mounted to the base 12, the attachment clips 408 extend upwardly through the opening 26 of the base 12 and engage an upper surface 412 of the inside rim 24 of the base 12. The attachment clips 408 include a radially outwardly (with respect to the base 12) and upwardly extending rim-engaging portion 413 disposed a predetermined distance from the base portion 404 of the support attachment 400, which rim-engaging portion 413 contacts the upper surface 412 of the rim 24 of the base.

The attachment clips 408 also include a releasing portion 415 extending radially inwardly and upwardly from the rim-engaging portion 413 which can be engaged by a user to urge the attachment clip 408 inwardly to detach the support attachment 400 from the base 12. The rim-engaging portion 413 of the attachment clips 408 is connected to the base portion 404 of the support attachment 400 by a preferably straight shaft 417 of resilient material.

Preferably, the circumferential rib 407 contacts the bottom 30 of the base 12 at a plurality of locations (e.g., four locations) between the feet 33 of the base 12. Also, all four of the feet 33 are preferably disposed within the circumferential rib 407 when the support attachment 400 is connected to the base 12. The circumferential rib 407 is preferably located radially outwardly from and closely follows the curvature of the bottom 30 of the base 12 along a first pair of segments 414 of the rib 407 (see FIG. 8), and is located radially inwardly of the bottom 30 of the base 12 along a second pair of segments 416 of the rib 407 separating the first pair 414. Two air passageways 419 of substantial cross-sectional area are created between the support attachment 400 and the base 12 in the regions of the radially inward segments 416 of the circumferential rib 409 to permit the free flow of air adjacent the heat source towards the base 12.

Preferably, the feet 33 of the base 12 prevent the support attachment 400 from rotating relative to the base 12 such that the user can reliably and safely determine the proper alignment of the support attachment 400 when placing the cooking device over a heating element, based upon the alignment of the handles 13 of the base 12.

It can be appreciated that the support attachment 400 substantially increases the amount of surface area available to support the cooking device in a stable manner while reducing the overall footprint of the device and providing sufficient airflow to the heating element.

Referring to FIG. 11, a lifting device 500 is provided for selectively removing or replacing the cooking plate 14 to or from the base 12. The lifting device 500 has a handle portion 502 and a cooking plate lower surface engaging portion 504. The cooking plate lower surface engaging portion 504 is sized and shaped to be received within one of the through holes 206, 208 in the cooking plate 14 and to contact the lower surface of the cooking plate. It can be appreciated that the lower surface of the cooking plate 14 may be either the grilling surface 200 or the griddle surface 202, depending on the orientation of the cooking plate 14. The lifting device 500 also has a cooking plate upper surface engaging portion 506 which contacts the upper surface of the cooking plate 14 in an area radially outwardly from the area at which the cooking plate lower surface engaging portion 504 contacts the lower surface of the cooking plate 14, thereby providing a balancing moment to stabilize and lift the cooking plate 14 away from the base 12.

Preferably, the cooking plate lower surface engaging portion 504 is connected to the cooking plate upper surface engaging portion 506 by a first step portion 508, and the handle is connected to the cooking plate upper surface engaging portion 506 by a second step portion 510. The lifting device can be formed or wire, as depicted, or from any other suitable material.

Figure 13:
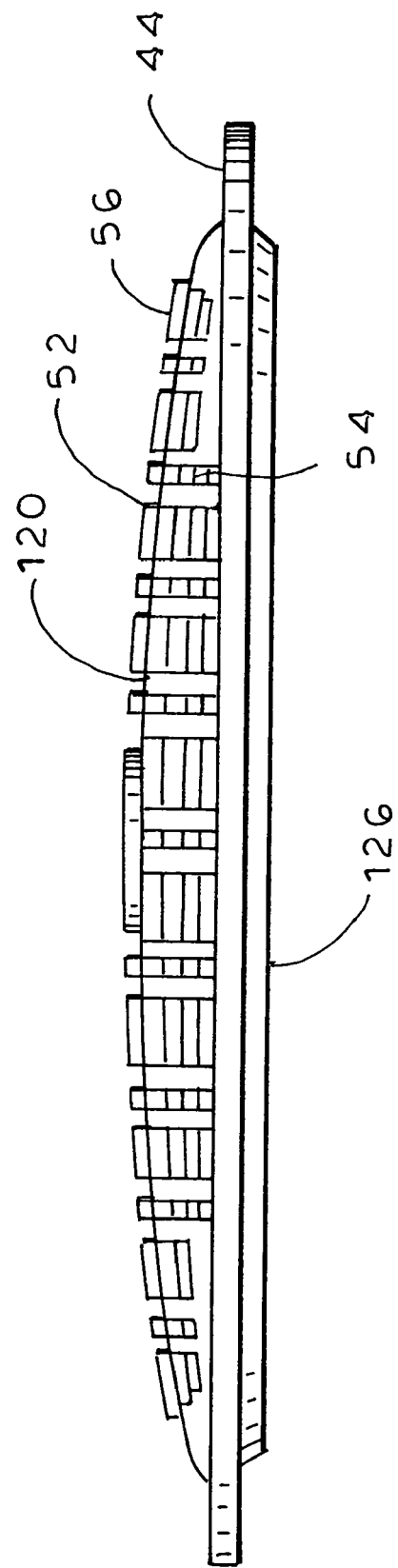
FIG. 13 is a side elevation view of the cooking plate of FIG. 12.

Referring to FIGS. 12–13, another embodiment of the invention includes a reversible cooking plate 120 having a substantially convex or domed so-called grilling surface 122 on one side 124 and a substantially flat so-called griddle surface 126 on an opposite side 128. The grilling surface 122 has a crowned (e.g., partially spherical) shape with an apex in a center portion 42 thereof. The cooking plate 120 also has a preferably substantially planar annular peripheral region 44, with a circular drainage channel 46 disposed intermediate a peripheral edge 48 of the cooking plate 120 and the grilling surface 122. The cooking plate 120 also preferably has a plurality of through holes 49a, 49b in the annular peripheral region 44 which may be disposed at regular angular intervals around the peripheral region 44. When the cooking plate 120 is properly mounted upon the base 12, the through holes 49a, 49b are aligned above the reservoir 22 of the base 12. Therefore, it can be appreciated that liquids flowing from the grilling surface 122, through the drainage channel 46 and/or to the through holes 49a, 49b, will flow into and be collected by the reservoir 22.

The cooking plate 120 includes through holes of a first size 49a and of a second size 49b. The through holes of the first size 49a are sized and shaped to closely receive the tines of an average fork to permit the placement and removal of the cooking plate 120 using a common residential kitchen fork. The through holes of the second size 49b are preferably larger than through holes 49a to permit the user to view the state and level of the liquid within the reservoir 22 without removing the cooking plate. Further, the through holes of the second size 49*b* are of sufficient size to permit the addition of liquid to the reservoir 22 without removing the plate.

The cooking plate 120 preferably has a plurality of columns of elongated, substantially rectangular ribs 50 projecting upwardly from the grilling surface 122. Each adjacent rib 50 in a column is preferably separated by a gap 52 to permit the downward (and outward) flow of liquids produced in the cooking process.

Columns of a first set of columns 54 of ribs 50 are preferably aligned substantially parallel, or collinear to one another and substantially perpendicular to columns of a second set of columns 56, thereby forming a substantially cross-hatched pattern of ribs. It can be appreciated that the pattern of ribs 50 will tend to produce a desirable grilled appearance and texture to the food items on the cooking plate 120. In addition, the ribs partially elevate the food items to facilitate draining of fats and liquids from the food.

Certain ribs 50 of the second set of columns 56 of ribs 50 pass through gaps 52 between adjacent ribs 50 of the first set of columns 54 of ribs, and preferably bisect such gaps 52. The gaps 52 are substantially wider than the ribs 50 passing therethrough such that there exists passages 58 between all of the ribs 50. Thus, liquid produced in the cooking process will flow downwardly by the force of gravity but will flow in a non-linear, meandering route which provides for a desirable gradual release of liquids produced in the cooking process while permitting full drainage.

Referring to FIG. 14, a third embodiment of the cooking plate 320 includes a plurality of thermo-conductive projections, such as the spaced-apart, parallel elongated flanges 36 depicted, which project downwardly from the bottom 34 of the cooking plate 320 toward the heating element (not shown). The flanges 36 serve to aid in the transfer of heat from the heating element 28 to the cooking plate 320 by increasing the surface area available for convection and radiant heating of the cooking plate 320. The flanges 36 also serve to distribute the heat across the surface of the cooking plate 320. The flanges 36 also increase the thermal inertia of the cooking plate 320.

The flanges 36 can include an undulating, curvilinear profile 38 as depicted or can have any other suitable profile. While the projections are depicted as contiguous flanges, non-contiguous or discreet projections, such as rod-like or triangular projections, or the like, are also within the scope of the invention.

The flanges 36 of the cooking plate 120 may be aligned with the associated columns of one of the set of columns 54, 56 of ribs 50 such that the heat acquired by the flanges 36 may be passed most directly to the ribs 50 thereby optimizing the grill appearance and texture produced by the ribs 50.

As mentioned previously, the side and top walls 112, 114 are typically configured and sized for inducing at least one substantially predetermined steam re-circulation pattern within the cooking device 10. In accordance with one possible steam re-circulation pattern, the steam rises peripherally substantially adjacent the side wall 112 before reaching the top wall 144. A substantial, predetermined portion of the steam then condenses on the top wall 144 adjacent a predetermined location thereof before falling back by gravity towards the cooking plate 14. Preferably, the steam re-circulation pattern is substantially toroidal in shape.

The remainder of the steam having reached the top wall 114 is biased by the later initially towards the apex thereof and then substantially centrally and downwardly towards the cooking plate 14. The downward current of steam eventually reaches the food.

A substantial, predetermined portion of the steam reaching the food will condense thereon hence efficiently transferring heat and moisture thereto. Excess condensed moisture will be mixed with the liquid by-products of the cooking operation and flow in liquid form into the reservoir 22.

The liquid content of the reservoir 22 may then be transformed into newly generated steam by the heating element 28. This newly generated steam will rise and eventually mix with the remainder of the steam having reached the region of the food without condensing.

Figure 16:
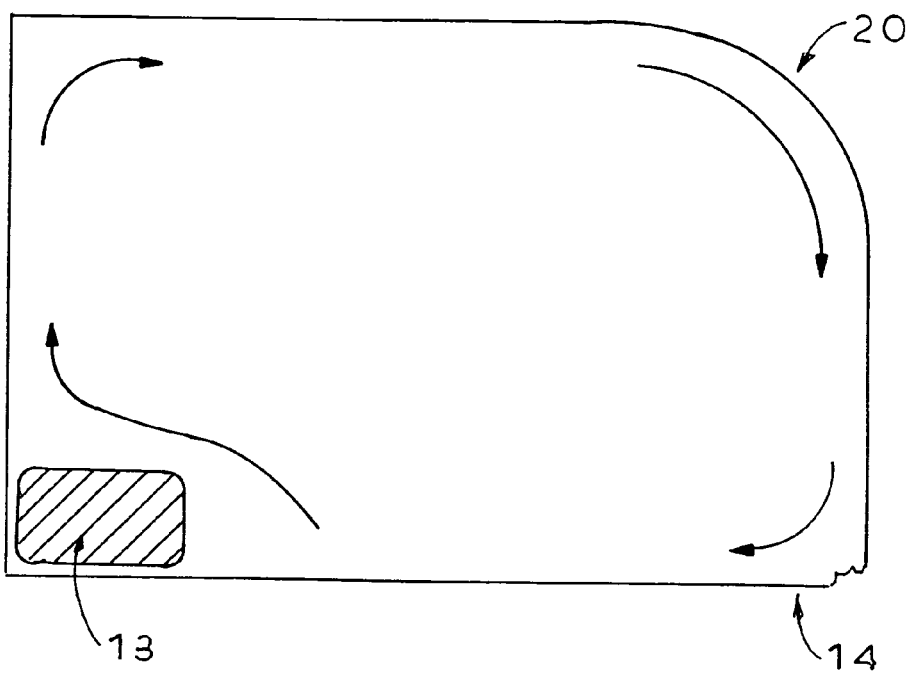
FIG. 16 is a schematic view of the convective flow pattern in the cooking volume according to an alternate embodiment.
Figure 15:
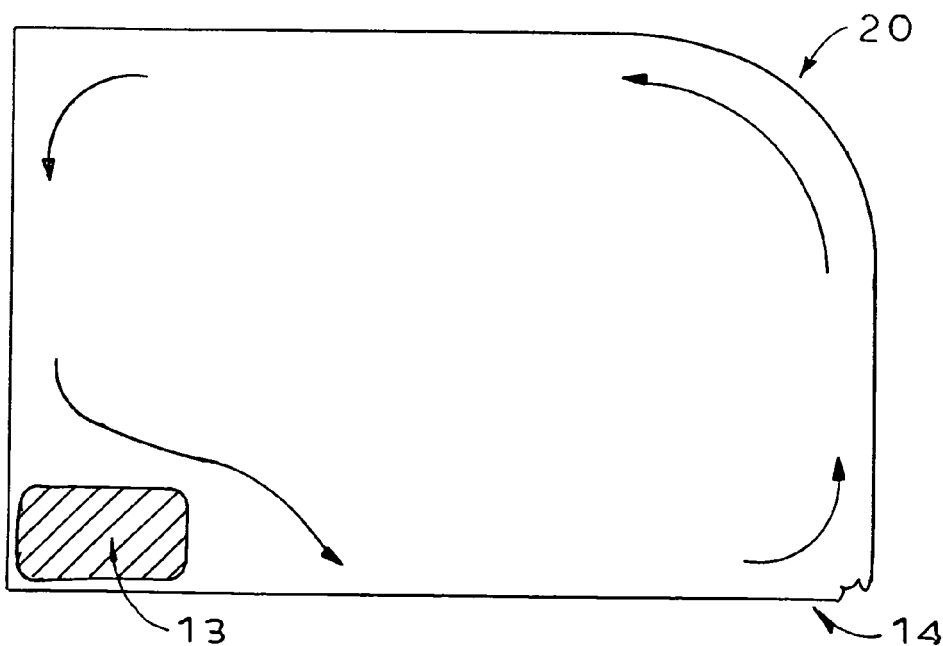
FIG. 15 is a schematic view of the convective flow pattern in the cooking volume according to one embodiment.

This mixture of steam will begin another cycle of re-circulation. As illustrated in FIG. 15, when the cooking device 10 is used with the lid 20, one possible re-circulation cycle hence typically defines a substantially whirling pattern wherein steam rises substantially circumferentially and peripherally and descends substantially centrally. In FIGS. 15 and 16, the food being cooked is schematically illustrated and designated by the reference numeral 13.

Alternatively, as illustrated in FIG. 16, the steam may rise substantially centrally and descend substantially peripherally. In order to describe some of the heat transfer processes generated by the present invention during a typical cooking operation performed without the steam rack several key assumptions are made.

First, an assumption is made to the effect that the system formed by the cooking device 10 in operation is in dynamic equilibrium, meaning that although there is movement of heat and air, in addition to vaporization and condensation of water, the heat transfer characteristics are constant in time. Also, the cooking volume is assumed to contain a saturated steam environment which is supported by the vaporization of water in the reservoir 22.

The cooking volume is held to be atmospheric pressure since the fork and steam openings, through the plate 14 interface, are open to atmosphere. The food items being cooked are considered as interacting heat transfer media. Since their nature potentially varies from recipe to recipe, the food item will be idealized as a cylindrical object with the approximate material properties of meat. With these assumptions in mind, a general qualitative overview will now be developed.

The plate 14, supported by the base 12, is located above the heating element on the stovetop. Typically, although by no means exclusively, the base 12 is located approximately 28 cm above the heating element. All three heat transfer mechanisms act to move heat from the element to the plate 14, however it is not necessary to characterize this process since, during cooking at high heat, we assume that the plate 14 maintains a near-constant temperature in most regions. This assumption is made with the knowledge that within the plate 14, conduction is the dominant heat transfer mechanism, and acts to distribute heat evenly throughout.

The surface of the plate 14 directly below the food item (consider meat in this case) would have a lower temperature due to conductive heat transfer to the meat itself. Also, the perimeter of the plate 14 above the reservoir 22 will have a lower temperature than the central regions due to radiative and conductive heat transfer to the grill base and liquid in the reservoir 22, in addition to the fact that this region is not exposed directly to the radiation originating from the heating element.

The reservoir 22 absorbs heat from several locations: the interior reservoir 22 wall absorbs heat from the heating element, both interior and exterior wall absorb heat conductively from the plate 14, and the water itself absorbs radiative energy from the plate 14 above. At atmospheric pressure liquid water cannot exceed 100° C., and so the liquid is maintained near this critical temperature.

Additional heat entering the reservoir 22 is responsible for the vaporization of water at the surface of the liquid, which is drawn into the cooking volume through convective processes. Condensed water from the lid 20 side is returned to the reservoir 22 along the exterior reservoir wall and fat from the meat flows into the reservoir 22 along the drain channel of the plate 14. These mechanisms act to maintain liquid levels, with some loss due to the escape of steam, during cooking.

Radiation within the cooking volume originates in the plate 14, and secondarily in the steam. Liquid water, steam, meat and stainless steel interact very differently with radiation. Table 1 shows their general behavior.

TABLE 1

General radiative interaction properties of material elements

| Radiative Medium | Absorption | Reflection | Transmission |
|---|---|---|---|
| Water, Meat | High | Low | Low |
| Steam | Medium | Medium | Medium |
| Polished Stainless Steel | Low | High | Low |
| Plated Metal, Black | High | Low | Low |

The important things to note in Table 1 are that food items absorb radiation, stainless steel reflects it, and steam does both. The inside of the lid 20 has a polished stainless steel surface which reflects efficiently in a directional manner toward the item being cooked, however steam, since it is a collection of approximately spherical particles, reflects diffusely.

Steam will absorb radiation to the extent that it maintains its saturated temperature at atmospheric pressure, and the remainder will be transmitted and reflected. Since the reflection of steam is diffuse in nature and the radiation occurs in a closed system, we will assume that all of the radiation not absorbed by the steam is transmitted.

Natural convection in the cooking volume is primarily governed by three factors; the high-temperature plate 14, the heat loss through the lid 20, and the surface temperature of the item being cooked. In order to determine the direction and speed of the flow, information about the surface temperatures in the system must be known.

The temperature of the plate 14, as mentioned previously, is assumed to be constant in the central regions, and diminishes towards its edge over the reservoir 22. The inside surface of the lid 20 is also maintained at a near-constant temperature through conduction with the steam.

Like the plate 14, since conduction is the dominant heat transfer mechanism within the lid 20, we can approximate its temperature as being close to that of saturated steam at atmospheric pressure. The surface temperature of the meat is governed by conduction and radiation from the plate 14 and surrounding steam, convection, and reflected radiation from the lid 20. Surface temperature decreases as the distance from the plate 14 increases. FIG. 16 shows a schematic of the likely convective flow patterns based on surface temperature information.

Heat is transferred convectively from the plate 14 to the food item by first heating the passing steam. The steam in the boundary layer surrounding the food item is at a higher temperature than the surface of the food item itself, which results in a flow of heat from the steam into the food item. The flow in the clockwise (according to FIG. 16) direction ensures that heat is moved from the plate 14 to the food item. The cooler outer rim of the plate 14 helps to establish this type of flow.

The pressure inside the cooking volume is assumed to be atmospheric, which leads to the condition that the rate of mass (in the form of air) entering the cooking volume is equal to the rate of mass leaving the cooking volume (assuming equal densities). The flow entering and leaving the cooking volume is sensitive to a number of factors, and would be difficult to predict accurately, however we can assume three basic situations; the case where there is no flow in or out of the volume, the case where there is flow in through the plate/interior channel wall interface and out through the grill base/lid interface, and the case where there is flow out of both of these interfaces. The fact that this communication exists between the outside atmosphere and the cooking volume is important in regulating the pressure inside, however its impact on the overall flow patterns are likely negligible.

In order to determine the heat transfer rate through conduction, measured in Watts, to the food item, we consider the proportion of the food item exposed to each conductive medium. A cylindrical food item with a radius of 5 cm and thickness of 3 cm is placed in the centre of the grill. The area of the plate 14 actually contacting the item is assumed to be 0.25 of the area of the base of the meat, since it only contacts the plate 14 on the surface of the grill ribs. The remainder of the conductive heat transfer takes place through the steam/food item interface, which represents the remaining area of the food item. Here the boundary temperature of the steam is taken to be 105° C. to reflect the elevated temperature of the convective flow. Two rates are calculated; from plate 14 to food item and from steam to food item. We assume a temperature at the midline of the food (L=1.5 cm) of 70° C., the recommended internal temperature for chicken and beef. The plate 14 temperature is taken to be 180° C., and the thermal conductivity of the good item is taken to be that of water. We assume the cylindrical food item is 5 cm in radius, 3 cm high. Note that the conduction from the plate 14 only occurs through 25% of the bottom surface of the food item. This is a result of the grill ribs.

$k_{meat}$=0.664 W/m$^2$K $\Delta T$=110 K $A$=0.25(0.0078 m$^2$)

$$q_{grill} = \frac{kA}{L}\Delta T = \frac{0.644 \cdot 0.25 \cdot 0.0078 \cdot 110}{0.015} = 9.5 \text{ W}$$

Performing a similar calculation for steam, assuming a median steam temperature of 105° C., and the entire area of the food item except for the plate contact area, we find:

$\Delta T$=35 K $A$=1.75(0.0078)+0.1π(0.03)m$^2$ $$q_{steam} = \frac{kA}{L}\Delta T = \frac{0.644 \cdot 0.23 \cdot 35}{0.015} = 35.7 \text{ W}$$

The results may hence be summarized as:

$q_{plate}$=9.5 W $q_{steam}$=35.7 W $q_{conduction}$=45.2 W

The contribution from the plate 14 is much lower than that for the steam due in large part to the reduction in contact area caused by the grill ribs.

Three components of radiative heat transfer are calculated. The first component is radiation from the plate 14 surface below the food item. We assume there is no absorption between the two surfaces, which yields the following result:

$$q_{grill}=1.2\ W$$

Based on empirical data for atmospheric saturated steam at 100° C., the considerable radiative contribution from the steam can be calculated. The radiative heat transfer presented is based mostly on the Stefan-Boltzmann equation for black body radiation. The important transport factors incorporated are emissivities for water, coated metal, and steam at atmospheric pressure, and appropriate temperatures (table A1). The peak wavelength of the radiation originating from the plate 14 is taken to be 5 µm. From the plate 14 to the bottom of the food item, the radiation is given by [2]:

$$q_{grill} = \frac{A\sigma(T_{grill}^4 - T_{food}^4)}{\frac{1}{\varepsilon_{food}} + \frac{1}{\varepsilon_{grill}} - 1}$$

Using values from the conductive case and table A1, we find:

$$q_{grill} = \frac{0.0078 \cdot 5.67 \times 10^{-8}(453^4 - 343^4)}{\frac{1}{0.95} + \frac{1}{0.10} - 1} = 1.24\ W$$

For radiation transferred from the steam directly to the top and side surfaces of the food item we use an empirical formulation for the radiative flux, E, from a volume of steam at a given temperature and pressure. This hemispheric cavity radiates diffusely to an object at the centre of its base. The emissivity from tables in ref. 2 is found to be $\varepsilon_{steam}=0.2$, and the absorptivity of the food item, $\alpha_{food}=0.9$.

$$q_{steam}=\alpha_{food}A\varepsilon_{steam}\Gamma T^4_{steam}=0.9 \cdot 0.055 \cdot 0.2 \cdot 5.67 \times 10^{-8} \cdot 373^4 =10.85\ W$$

The final contribution is from a combination of reflected radiation from the plate 14 and steam. Here we consider absorption by the steam, with $\alpha_{steam}=0.4$, and reflectivity of the polished stainless lid 20, $\rho_{lid\ 20}=0.9$. The radiation from the steam is intercepted by the entire surface of the lid 20, with area $A_{lid\ 20}=0.174\ m^2$, and is reflected. The entire equation is:

$$q_{reflected}=\varepsilon^2_{steam} \cdot \rho_{cover} \cdot \alpha_{food}[q_{grill,total}-q_{grill}+ A_{cover} \cdot \varepsilon_{steam} \cdot \Gamma \cdot T^4_{steam}]$$

$$q_{reflected}=6.7\ W$$

Here $q_{grill,total}$ is the total radiated energy from the surface of the plate 14.

Hence, in summary, the heat transfer directly from the steam was found to be:

$$q_{steam}=10.8\ W$$

Also, the final contribution considered is radiation originating from both the plate 14 and the steam, and reflecting off of the polished stainless steel lid 20. This calculation takes into account the absorption and reemission of radiation in the steam, as well as the reflective nature of the lid 20 finish. No formal treatment of the geometry of the lid 20 has been attempted; however a favourable reflectivity has been implemented owing to its rounded sides that act to focus radiation. The heat transfer rate from reflected radiation was found to be:

$$q_{reflected}=6.7\ W$$

The total from all components of radiation into the food item is then:

$$q_{radiation}=18.7\ W$$

Heat transfer through convection is analyzed in two main steps. First, the average speed of the flow is estimated through comparing the lid 20 and plate 14 surface temperatures. This velocity is then applied to a semi-empirical formulation for convective heat transfer from an upwind, hot surface to a downwind, cooler surface. This analysis will assume a single uninterrupted flow region as pictured in FIG. 16 Since the plate 14 is at a significantly higher temperature than the surface of the food item, and the steam flow runs over the surface of both, heat will be transferred from the plate 14 first to the passing steam, and finally to the food item.

The underlying theory of this section is the most complicated of the three. The analysis is developed in two steps: First a characteristic velocity and Reynolds number are determined through empirical formulations. Second, the steam flow rate is applied to an empirical horizontal plate model for laminar flow. Convection from a heated, upwind plate is integrated over a cooler downwind plate. The characteristic velocity, $u_w$, is given by:

$$u_w=\sqrt{g\beta L \Delta T}$$

where L is the characteristic length, here 10 cm, g is the gravitational acceleration, and the temperature difference is 10° C., taken as the maximum and minimum steam temperatures in the closed system.

$$u_w=\sqrt{981 \cdot 0.0396 \cdot 10 \cdot 10}=62.3\ cm/s$$

The dimensionless parameters, Reynolds number, Prandtl number and Nusselt number, are then:

$$Re = \frac{\rho L u_w}{\mu} = 2857.5$$

$$Pr = \frac{\mu c_p}{k} = 0.782$$

$$Nu=0.323\ Pr^{1/3}Re^{1/2}=15.9$$

Based on these factors, the following semi-empirical horizontal plate model is implemented, considering the outer rim of the plate 14 as x=0 cm, the border of the food item as $x_1=11$ cm, and $x_2=16$ cm. This accounts for half of the cooking volume in a planar section owing to the axisymmetric nature of the problem. Here the area, A, is considered as the entire top portion of the food item, which eliminates the need to double the entire quantity $q_{convective}$.

$$q_{convective} = A \cdot Nu \cdot k \Delta T \int_{\alpha 1}^{\alpha 2} \frac{1}{x} \frac{1}{\left(1-\left(\frac{x_1}{x}\right)^{\frac{3}{4}}\right)^{\frac{1}{3}}} dx$$

The integral is evaluated numerically to give 0.873. The temperature difference is taken to be 75° C., with the surface of the food item at 105° C. and the plate 14 at 180° C. The result is then:

$$q_{convective}=0.0078 \cdot 15.9 \cdot k \cdot 10 \cdot 0.873 = 24.5\ W$$

This approximation is likely the least accurate of the three heat transfer mechanisms presented, but is probably accurate to within 25%

In summary, the estimated mean flow speed in the cooking volume is calculated to be 62.3 cm/s. This flow speed, applied with the semi-empirical formulation, result in a total convective heat transfer rate to the food item of:

$q_{convection}$=24.5 W

Transfer rates for all three primary mechanisms of heat transfer result in a total heat transfer rate, Q, of:

Q=88.4

Material properties employed in the following calculations [1,2,3]:

TABLE A1

| Property | symbol | value (cgs) |
|---|---|---|
| viscosity | μ | 1.300E−04 |
| thermal conductivity | k | 2.480E+03 |
| Tsat | T | 3.730E+02 |
| specific heat capacity | cp | 2.030E+07 |
| heat transfer coefficient | h | 1.000E+04 |
| density | ρ | 5.904E−04 |
| volume expansion coeff. | β | 3.577E−02 |
| stefan-boltzmann const. | σ | 5.670E−05 |
| emissivity of water | ε | 9.200E−01 |
| emissivity of stainless | ε | 1.400E−01 |
| emissivity of steam | ε | 2.500E−01 |

The volume expansion coefficient for saturated steam at atmospheric pressure between 100° C. and 108° C. was calculated based on the following data [3].

TABLE A2

| Temperature (° C.) | ρ (kg/m³) |
|---|---|
| 100 | 0.5977 |
| 101 | 0.618 |
| 102 | 0.6388 |
| 103 | 0.6601 |
| 104 | 0.6821 |
| 105 | 0.7046 |
| 106 | 0.7277 |
| 107 | 0.7515 |
| 108 | 0.7758 |

From the heat transfer rates calculated, it can be seen that conduction is the dominant heat transfer mechanism, delivering heat at about twice the rate compared with convection and radiation. These results indicate that at the surface interface between the food item and the cooking volume are strongly affected by the three transfer mechanisms as shown in FIG. 17.

The cooking device 10 makes use of all three heat transfer mechanisms which leads to a higher surface temperature when compared to conduction and radiation alone. This high surface temperature would act to heat the outer surface more quickly, while maintaining similar overall internal heat transfer behavior. This is a direct result of the unique curvature, proportions and surface finish of the lid 20, and convective flow conditions.

The curvature of the lid 20 is crucial in developing a stable convective flow region by directing the flow in an uninterrupted stream from the top of the cooking volume to the plate 14. With a taller lid dimension, vertical flow regions would dominate which would reduce the efficiency of heat transfer from the plate 14 to the food item through horizontal flow. In addition, the curvature and polished surface finish of the lid 20 help to focus and reflect radiation.

The saturated steam environment in the cooking device 10 is also important to its heat transfer characteristics. Since the environment in the cooking volume attains a form of dynamic equilibrium, water vapor is always present at the food item surface. The amount of steam in the volume is maintained by evaporation from the reservoir 22, which ensures that there is virtually no net moisture loss during the cooking process.

Some of the unique aspects of the cooking device heat transfer mechanisms are easily put in perspective through a comparison with traditional pressure cookers, woks, and standard stainless cookware. This comparison will be presented as a table with qualitative assessments of each heat transfer mechanism, followed by a discussion of each column in the table.

TABLE 2

A comparison between cooking device 10 and other cooking devices.

| Device | Convection | Conduction | Radiation | Cooking Environment |
|---|---|---|---|---|
| Cooking device 10 | Stable horizontal flow from heating element to food item. | Main contribution from steam, grill ribs suspend food item. | Focused, polished surface reflects radiation. Steam contributes. | Saturated steam, no net moisture loss from system, atmospheric pressure. |
| Pressure cooker | Possible vertical flow, unshaped. Possible reversed flow. | Main contribution from steam. | Main contribution from steam. | Superheated steam above atmospheric pressure causing greater radiative and conductive heat transfer rates. |

TABLE 2-continued

A comparison between cooking device 10 and other cooking devices.

| Device | Convection | Conduction | Radiation | Cooking Environment |
|---|---|---|---|---|
| Wok | Shaped, stable flow. Possibly reversed. | Approximately equal contributions from steam and pan base. | Focused, may be polished. Steam contributes. | Steam with net moisture loss, slightly above atmospheric pressure. |
| Stainless cookware | Possible vertical flow, unshaped. Possible reversed flow. | Approximately equal contributions from steam and pan base. | Not focused, may be polished. Steam contributes, | Steam with net moisture loss, slightly above atmospheric pressure. |

The unique convective elements of the cooking device 10 are the shaping of the flow by the lid 20, and the assurance of convective heat transfer from heating element to food item caused by a cool plate perimeter. In the case of the pressure cooker and the stainless cookware, the base is maintained at a constant temperature and will at all points act to heat the air at the bottom of the cooking volume. Since the surface of the food item is cooler this may lead to a reversal of the convective flow which would result in heat being transferred from the food item to the steam. In the case of the wok, conduction in the curved side of the pan would supply heat to steam at higher levels in the cooking volume. This may also lead to a counterproductive convective process like that described for the pressure cooker and the stainless cookware.

With conduction, differences between the cooking device 10 and other devices are a result of its grill ribs; they allow conduction from steam to dominate. Without ribs the food item would receive 75% more heat conductively, which would lead to a less even conductive heating process. In the case of the pressure cooker, the high pressure steam at a high temperature would likely dominate the conductive heat transfer. The Cooking device 10 conductive process would be expected to result in a more even heat distribution within the food item.

With radiation, the cooking device 10 and wok would result in similar radiative heat transfer properties, depending strongly on the surface finish of the wok lid 20. In all cases there would be a contribution to radiation by steam. A high degree of overall reflectivity in the cooking volume would be expected for stainless steel devices owing to its more reflective base.

As far as the cooking environment is concerned, net moisture loss does not occur in either the pressure cooker or the cooking device 10. The pressure cooker operates at higher pressures which lead to higher steam temperatures, so the heat transfer rates would be higher, however the internal interaction between the steam and the food item might also be greater. The remaining devices would operate at pressures very slightly above atmospheric depending on the seal generated by the mass of their lids. They would also have net moisture loss which would ultimately result in moisture escaping from the food item itself.

In summary, with convective heat transfer in mind, the cooking device 10 is believed to be superior design to the wok, pressure cooker and stainless cookware. In terms of radiation and conduction it is expected that the cooking device 10 would perform as well or better than the other devices considered. The cooking device's saturated steam environment in dynamic equilibrium at atmospheric pressure ensures no net moisture loss from the system while avoiding overcooking problems characteristic of pressure cookers. In terms of overall design, the heat transfer properties of the cooking device 10 are considerably more complex than other devices, but this preliminary comparison indicates that each design element serves a practical purpose in creating favorable cooking conditions.

It can be appreciated that the cooking device 10 provides the ability to perform direct contact grilling of food items, simultaneously or separately with other types of cooking methods including steaming, in a variety of contexts such as indoors on a conventional stove, in a convenient and efficient manner. The easily removable rack and the cooking plate employ the enclosed heat and moisture produced in the cooking process to permit the cooking of other food items simultaneously or separately. The grilling surface imparts the desirable texture and appearance to grilled food items and provides for controlled drainage of liquids produced in the cooking process into the reservoir 22 of the base 12. The reservoir 22 provides for the collection and re-circulation of liquids and moisture from the cooking process which are effectively retained by the dome lid lid 20 and employed in the cooking process.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed is:

1. A cooking device for cooking food items over a heat source, said cooking device comprising:
   a base having an annular reservoir, said reservoir having an inside rim defining an opening in said base; and
   a reversible cooking plate supportable by said base over said reservoir and said opening in said base, said cooking plate having a first cooking surface on a first side and having a second cooking surface on a second side;
   said cooking plate being supportable by said base in a first supported position and in a second supported position, wherein when said cooking plate is in said first supported position, said first cooking surface is directed upwardly in an inclined relationship with respect to said base and, when said cooking plate is in said second supported position, said second cooking surface is directed upwardly and in a substantially parallel relationship relative to said base;
   wherein in said first supported position said cooking plate has a lower end,
   said cooking plate has a through hole in said lower end;
   said through hole being aligned above said reservoir such that fluid flowing down said first cooking surface flows into said reservoir.

2. A cooking device as in claim 1, wherein:
said first cooking surface includes a channel disposed along a periphery of the cooking plate adjacent said lower end thereof,
said channel leading to said through hole.

3. A cooking device as in claim 2, wherein:
said first cooking surface includes a plurality of upwardly-extending, elongated ribs, said ribs being substantially diametrically aligned in a direction extending between said lower end of said cooking plate and a higher end thereof.

4. A cooking device as in claim 1, wherein:
inclined support means extends from said second cooking surface;
said inclined support means has a first height at a first end of said cooking plate and has a second height, greater than said first height, at a second end of said cooking plate, said second end of said cooking plate being opposite said first end;
said inclined support means contacting said base when said cooking plate is in said first supported position.

5. A cooking device as in claim 4, wherein:
when said cooking plate is in said second supported position, said inclined support means forms a contiguous peripheral barrier around said second cooking surface to inhibit a flow of liquid off said second cooking surface.

6. A cooking device as in claim 1, wherein said cooking device further comprises:
a support adaptor releasably attachable to said base,
said support adaptor having a substantially planar base portion having an outsider periphery and having a center opening having an inner periphery;
said support adaptor having a plurality of resilient attachment clips affixed to said base portion, said attachment clips engaging an upper surface of an inside rim of said reservoir of said base; and
said base portion of said support adaptor contacting a bottom of said base.

7. A cooking adaptor for cooking a piece of food, said cooking adaptor being positionable on a supporting surface and being heatable by a source of heat, said cooking adaptor comprising:
a first cooking surface for receiving said piece of food and allowing the latter to be cooked thereon, said first cooking surface defining a first surface peripheral edge;
first abutment means mechanically coupled to said first cooking surface for abuttingly contacting said supporting surface and allowing said cooking adaptor to stably rest thereon;
said first cooking surface defining apex and nadir sections thereof respectively located more distally and more proximally relatively to said supporting surface when said first abutment means contacts said supporting surface;
a drainage aperture formed in said first cooking surface for draining liquids therefrom when said liquids are forced to flow under the action of gravity in a direction leading generally from said apex to said nadir sections; and
a flow guiding means coupled to said first cooking surface for guiding the flow of said liquids towards said drainage aperture.

8. A cooking adaptor as recited in claim 7 wherein said flow guiding means includes at least one rib extending from said first cooking surface, said at least one rib being configured, positioned and sized to assist in guiding the flow of said liquids towards said drainage aperture.

9. A cooking adaptor as recited in claim 7 wherein said flow guiding means includes at least one pair of substantially rectilinear ribs extending from said first cooking surface in a substantially parallel relationship relative to each other.

10. A cooking adaptor as recited in claim 7 wherein said flow guiding means includes at least one guiding channel formed in said first cooking surface, said at least one guiding channel being in fluid communication with said drainage aperture.

11. A cooking adaptor as recited in claim 7 wherein said flow guiding means includes
at least one rib extending from said first cooking surface;
at least one guiding channel formed in said first cooking surface;
said at least one rib being configured, positioned and sized to assist in guiding the flow of said liquids towards said at least one guiding channel and said at least one guiding channel being in fluid communication with said drainage aperture.

12. A cooking adaptor as recited in claim 7 further comprising a flow slowing means for slowing the flow of said liquids towards said discharge aperture.

13. A cooking device as recited in claim 12 wherein said flow slowing means includes at least two ribs extending from said first cooking surface, said at least two ribs being configured, positioned and sized so as to alter the direction of flow of said liquids as the latter flow towards said discharge aperture.

14. A cooking device as recited in claim 12 wherein said flow slowing means includes a plurality of ribs extending from said first cooking surface, said ribs forming a rib pattern for meandering the flow of said liquids towards said discharge aperture.

15. A cooking adaptor as recited in claim 7 further comprising a heat transfer enhancing means thermally coupled to said first cooking surface for enhancing the transfer of heat from said source of heat to said first cooking surface.

16. A cooking adaptor as recited in claim 15 wherein said heat transfer enhancing means includes at least one heat related protrusion mechanically coupled to said first cooking surface and protruding from a portion of said cooking adaptor so as to extend in a direction leading generally towards said source of heat when said first abutment means is resting on said supporting surface.

17. A cooking adaptor as recited in claim 16 wherein said heat related protrusion is made out of a material having substantially high heat conductance characteristics.

18. A cooking adaptor as recited in claim 16 wherein said heat related protrusion also acts as a thermal inertia enhancing means thermally coupled to said first cooking surface for enhancing the thermal inertia of said first cooking surface, said heat related protrusion being made out of a material having substantially high thermal inertia characteristics.

19. A cooking adaptor as recited in claim 7 further comprising
at least one rib extending from said first cooking surface, said at least one rib being configured, positioned and sized to assist in guiding the flow of said liquids towards said drainage aperture;
at least one heat related protrusion mechanically coupled to said first cooking surface and protruding from a portion of said cooking adaptor so as to extend in a direction leading generally towards said source of heat when said first abutment means is resting on said supporting surface, said at least one heat related protrusion being substantially in register and in thermal coupling with said at least one rib so as to facilitate heat transfer between said source of heat and said at least one rib.

20. A cooking adaptor as recited in claim 7 further comprising a thermal inertia enhancing means thermally coupled to said first cooking surface for enhancing the thermal inertia of said first cooking surface.

21. A cooking adaptor as recited in claim 7 further comprising both
a heat transfer enhancing means thermally coupled to said first cooking surface for enhancing the transfer of heat from said source of heat to said first cooking surface and,
a thermal inertia enhancing means thermally coupled to said first cooking surface for enhancing the thermal inertia of said first cooking surface.

22. A cooking adaptor as recited in claim 7 wherein said first cooking surface has a generally flat configuration, said first cooking surface being positioned relative to the remainder of said cooking adaptor so as to be in an angled relationship relative to said supporting surface when said first abutment means contacts said supporting surface, said apex and nadir sections being located substantially adjacent said first surface peripheral edge in a generally opposite relationship relative to each other.

23. A cooking adaptor as recited in claim 22 wherein said first cooking surface has a substantially disc-shaped configuration, said drainage aperture being positioned adjacent said first surface peripheral edge in said nadir section, said first cooking surface being provided with at least one guiding channel formed therein, said at least one guiding channel being positioned substantially adjacent said first surface peripheral edge and having a substantially arcuate configuration corresponding substantially to that of said first surface peripheral edge, said at least one guiding channel being in fluid communication with said drainage aperture, said first cooking surface being also provided with at least one rib extending outwardly therefrom, said at least one rib having a substantially rectilinear configuration and being positioned so as to extend at least partially along a secant of said disc-shaped configuration towards said at least one guiding channel.

24. A cooking adaptor as recited in claim 23 further comprising manipulation facilitating means operatively coupled to said cooking adaptor for facilitating the manipulation of said cooking adaptor.

25. A cooking adaptor as recited in claim 24 wherein said manipulation facilitating means includes a manipulation aperture formed in said first cooking surface.

26. A cooking adaptor as recited in claim 25 wherein said manipulation aperture is positioned in a substantially diametrically opposed relationship relative to said drainage aperture.

27. A cooking adaptor as recited in claim 25 wherein said manipulation aperture is configured and sized for allowing at least partial insertion thereinto of at least one tine part of a conventional fork.

28. A cooking adaptor as recited in claim 22 further comprising a slanting means extending between said first cooking surface and said first abutment means for slanting said first cooking surface relative to said supporting surface when said first abutment means contacts said supporting surface.

29. A cooking adaptor as recited in claim 28 wherein said slanting means includes a substantially beveled mechanically coupled to said first cooking surface and extending in a direction substantially opposite to the latter, said beveled structure defining a beveled structure abutment edge located generally opposite said first cooking surface, said first abutment means including said beveled structure abutment edge.

30. A cooking adaptor as recited in claim 29 wherein said beveled structure is substantially continuous.

31. A cooking adaptor as recited in claim 29 wherein said beveled structure is formed by discrete and spaced apart beveled structure segments.

32. A cooking adaptor as recited in claim 7 wherein said first cooking surface has a substantially convex configuration, said nadir section being located substantially adjacent said first surface peripheral edge.

33. A cooking adaptor as recited in claim 32 wherein said first cooking surface has a substantially dome-shaped configuration, said apex being substantially centrally located relative to said first surface peripheral edge.

34. A cooking adaptor as recited in claim 33 wherein said first cooking surface includes a substantially centrally disposed and dome-shaped central section and a peripherally disposed and substantially flat peripheral section extending from said dome-shaped section to said first surface peripheral edge.

35. A cooking adaptor as recited in claim 34 including a plurality of circumferentially disposed drainage apertures extending through said peripheral section.

36. A cooking adaptor as recited in claim 35 further including a plurality of circumferentially disposed manipulation apertures extending through said peripheral section, each of said manipulation apertures being configured and sized for allowing at least partial insertion thereinto of at least one tine part of a conventional fork.

37. A cooking adaptor as recited in claim 33 wherein said first cooking surface is provided with a plurality of substantially rectilinear ribs projecting upwardly therefrom, at least a first set of said ribs being in a substantially collinear and spaced relationship relative to each so as to form at least one interrupted and generally rectilinear first rib pattern extending substantially diametrically across at least a portion of said first cooking surface.

38. A cooking adaptor as recited in claim 37 wherein at least a second set of said ribs are in a substantially collinear and spaced relationship relative to each other so as to form at least one interrupted and generally rectilinear second rib pattern extending substantially diametrically across at least a portion of said first cooking surface in an angled relationship relative to said first rib pattern.

39. A cooking adaptor as recited in claim 33 wherein said first cooking surface is provided with a plurality of substantially rectilinear ribs projecting upwardly therefrom, at least some of said ribs being disposed so as to form a substantially cross-hatched pattern.

40. A cooking adaptor as recited in claim 7 further comprising a valve means operatively coupled to said discharge aperture for selectively preventing and allowing the flow of said liquids through said discharge aperture.

41. A cooking adaptor as recited in claim 40 wherein said valve means includes an aperture plug releasably mountable over said discharge aperture for selectively obstructing the latter.

42. A cooking adaptor as recited in claim 40 wherein said valve means includes a valve plate movably coupled to said cooking adaptor for movement between a first valve position wherein said valve plate is in register with said discharge aperture so as to prevent the flow of said liquids therethrough and a valve second position wherein said valve plate is at least partially retracted from said discharge aperture so as to allow the flow of said liquids therethrough.

43. A cooking adaptor as recited in claim 22 further comprising an angle adjustment means for allowing adjustment of the angular relationship between said first cooking surface and said supporting surface when said first abutment means contacts said supporting surface.

44. A cooking adaptor as recited in claim 29 wherein said beveled structure has an adjustable configuration allowing for adjustment of the angular relationship between said first cooking surface and said supporting surface when said beveled structure abutment edge contacts said supporting surface.

45. A cooking adaptor as recited in claim 7 further comprising
- a second cooking surface for receiving said piece of food and allowing the latter to be cooked thereon, said second cooking surface being located substantially opposite said first cooking surface, said second cooking surface defining a second surface peripheral edge;
- second abutment means mechanically coupled to said second cooking surface for abuttingly contacting said supporting surface and allowing said cooking adaptor to stably rest thereon;
- said second abutment means allowing said second cooking surface to be in a substantially parallel relationship with said supporting surface when said second abutment means contacts said supporting surface.

46. A cooking adaptor as recited in claim 45 wherein said second abutment means includes an abutment rim mechanically coupled to said second abutment surface and extending in a direction substantially opposite to the latter.

47. A cooking adaptor as recited in claim 45 wherein said cooking adaptor has a substantially dihedral configuration, said cooking adaptor further including a slanting means extending between said first cooking surface and said first abutment means for slanting said first cooking surface relative to said supporting surface when said first abutment means contacts said supporting surface; said slanting means including a substantially beveled structure extending substantially outwardly from said second cooking surface substantially adjacent said second surface peripheral edge, said beveled structure defining a beveled structure abutment edge, said first abutment means including said beveled structure abutment edge; said second abutment means including an abutment rim extending substantially outwardly from said first cooking surface substantially adjacent said first cooking surface peripheral edge.

48. A cooking adaptor as recited in claim 47 wherein said drainage aperture extends through both said first and second cooking surfaces, said beveled structure being positioned so as to form a flow blocking means for preventing the flow of liquids into said drainage aperture from said second cooking surface when said abutment rim contacts said supporting surface.

* * * * *